(12) United States Patent
Lapstun et al.

(10) Patent No.: US 7,131,058 B1
(45) Date of Patent: Oct. 31, 2006

(54) METHOD AND SYSTEM FOR DEVICE CONTROL

(75) Inventors: Paul Lapstun, Rodd Point (AU); Jacqueline Anne Lapstun, Rodd Point (AU); Kia Silverbrook, Balmain (AU)

(73) Assignee: Silverbrook Research Pty Ltd, Balmain (AU)

( * ) Notice: Subject to any disclaimer, the term of this patent is extended or adjusted under 35 U.S.C. 154(b) by 599 days.

(21) Appl. No.: 09/693,647

(22) Filed: Oct. 20, 2000

(30) Foreign Application Priority Data

Dec. 1, 1999 (AU) .................................. PQ4392

(51) Int. Cl.
*G06F 17/30* (2006.01)
*G06F 17/40* (2006.01)
*G06F 3/038* (2006.01)
*G06F 3/12* (2006.01)
*G06F 3/033* (2006.01)
*G06F 3/037* (2006.01)

(52) U.S. Cl. .................... 715/501.1; 715/740; 715/771

(58) Field of Classification Search ................ 345/716, 345/717, 718, 719, 738, 740, 746, 747, 764, 345/765, 771, 773; 348/734, 552; 715/501.1, 715/513, 500.1, 776
See application file for complete search history.

(56) References Cited

U.S. PATENT DOCUMENTS

| 4,329,684 | A | | 5/1982 | Monteath et al. |
|---|---|---|---|---|
| 4,864,618 | A | | 9/1989 | Wright et al. |
| 5,051,736 | A | | 9/1991 | Bennett et al. |
| 5,086,385 | A | * | 2/1992 | Launey et al. ................ 700/83 |
| 5,477,012 | A | | 12/1995 | Sekendur |
| 5,631,984 | A | * | 5/1997 | Graf et al. .................. 382/317 |
| 5,652,412 | A | | 7/1997 | Lazzouni et al. |

(Continued)

FOREIGN PATENT DOCUMENTS

GB      2 306 669      5/1997

(Continued)

OTHER PUBLICATIONS

Boutin, Paul. "Multicast or Bust," Wired News Jun. 25, 1997. Jun. 15, 2005 <http://wired-vig.wired.com/news/technology/0,1282,4680,00.html>.*

(Continued)

*Primary Examiner*—Raymond J. Bayerl
*Assistant Examiner*—Namitha Pillai

(57) ABSTRACT

The invention concerns device control for enabling electrical or electronic devices to be controlled through computer systems. Employing the invention involves the use of one or more control interfaces which are capable of being used to interacting with a computer system or network, each interface typically comprising sheet material such as paper which has coded data disposed on it and which allows it to be used to interact with the computer system by use of a sensing device operated by a user. Through this interaction, data can be forwarded to the computer system from the control interface to effect in that system an operation relating to the functioning of the device.

26 Claims, 29 Drawing Sheets

U.S. PATENT DOCUMENTS

| | | | |
|---|---|---|---|
| 5,661,506 A | | 8/1997 | Lazzouni et al. |
| 5,692,073 A | | 11/1997 | Cass |
| 5,757,304 A | | 5/1998 | Redford et al. |
| 5,839,905 A | * | 11/1998 | Redford et al. ......... 434/307 R |
| 5,852,434 A | | 12/1998 | Sekendur |
| 5,889,506 A | | 3/1999 | Lopresti et al. |
| 6,068,188 A | * | 5/2000 | Knowles ................ 235/462.01 |
| 6,076,734 A | | 6/2000 | Dougherty et al. |
| 6,081,261 A | * | 6/2000 | Wolff et al. .................. 345/179 |
| 6,119,159 A | * | 9/2000 | Tseng et al. ................. 709/224 |
| 6,192,282 B1 | * | 2/2001 | Smith et al. ................... 700/19 |
| 6,288,716 B1 | * | 9/2001 | Humpleman et al. ....... 345/733 |
| 6,330,976 B1 | * | 12/2001 | Dymetman et al. ......... 235/487 |

FOREIGN PATENT DOCUMENTS

| | | | |
|---|---|---|---|
| WO | WO 99/18487 | * | 4/1999 |
| WO | WO 99/50787 | | 10/1999 |

OTHER PUBLICATIONS

Dymetman, M., and Copperman, M., Intelligent Paper; in Electronic Publishing, Artistic Imaging, and Digital Typography, Proceedings of EP '98, Mar./Apr. 1998, Springer Verlag LNCS 1375, pp. 392-406.

* cited by examiner

CREATE UNIVERSAL REMOTE CONTROL  PAGE 1 OF 1

CURRENT DEVICE SETUP: SETUP NAME

CHECK DEVICES REQUIRED ON UNIVERSAL REMOTE CONTROL

- ☐ DEVICE ALIAS  DEVICE TYPE
- ☐ DEVICE ALIAS  DEVICE TYPE
- ☐ DEVICE ALIAS  DEVICE TYPE

558 — PRINT URC

557

RESET FORM

FIG. 23

SET DEVICE DEFAULTS  | PAGE 1 OF # | TRAN NBR |

ADDING NEW DEVICE TO SETUP: | SETUP NAME |

ENTER DEVICE ALIAS FOR

| MANUFACTURER | DEVICE TYPE | MODEL |

ALIAS | DEVICE ALIAS |

DO YOU WANT THIS TO BE YOUR DEFAULT

YES

| DEFAULT DEVICE TYPE | ? ☐

| DEFAULT DEVICE TYPE | ? ☐

| DEFAULT DEVICE TYPE | ? ☐

| DEFAULT DEVICE TYPE | ? ☐

(CHECK ALL THAT APPLY)

554

555 ADD DEVICE

FIG. 29

METHOD AND SYSTEM FOR DEVICE CONTROL

FIELD OF INVENTION

The present invention relates generally to device control and, more particularly, to a method and system for enabling electrical or electronic devices to be controlled through distributed computing systems. It has specific application to the operation of a device involving a printed form-based user interface.

CO-PENDING APPLICATIONS

Various methods, systems and apparatus relating to the present invention are disclosed in the following co-pending applications/granted patents filed by the applicant or assignee of the present invention on Oct. 20, 2000:

Ser. Nos. 09/693,415, 09/693,219, U.S. Pat. No. 6,813,558, Ser. No 09/693,515, U.S. Pat. No. 6,847,883, Ser. Nos. 09/693,593, 09/693,647, 09/693,690, U.S. Pat. Nos. 6,474,888, 6,627,870, 6,724,374, Ser. Nos. 09/693,514, 09/693,301, U.S. Pat. Nos. 6,454,482, 6,808,330, 6,527,365, 6,474,773, 6,550,997

The disclosures of these co-pending applications are incorporated herein by reference.

Various methods, systems and apparatus relating to the present invention are disclosed in the following co-pending applications/granted patents filed by the applicant or assignee of the present invention on Sep. 15, 2000:

U.S. Pat. No. 6,679,420, Ser. Nos. 09/663,599, 09/663,701, U.S. Pat. No. 6,720,985

The disclosures of these co-pending applications are incorporated herein by reference.

Various methods, systems and apparatus relating to the present invention are disclosed in the following co-pending applications/granted patents filed by the applicant or assignee of the present invention on Jun. 30, 2000:

U.S. Pat. No. 6,824,044, Ser. Nos. 09/607,852, 09/608,970, U.S. Pat. No. 6,678,499, Ser. No. 09/607,656, U.S. Pat. No. 6,766,942, Ser. Nos. 09/609,303, 09/610,095, 09/609,596, 09/607,843, 09/607,605, 09/608,178, 09/609,553, 09/609,233, 09/609,149, 09/608,022, 09/609,232, 09/607,844, U.S. Pat. Nos. 6,457,883, 6,831,682, Ser. No. 09/607,985, U.S. Pat. Nos. 6,398,332, 6,394,573, 6,622,923

The disclosures of these co-pending applications are incorporated herein by reference.

Various methods, systems and apparatus relating to the present invention are disclosed in the following co-pending applications/granted patents filed by the applicant or assignee of the present invention on 23 May 2000:

Ser. Nos. 09/575,197, 09/575,195, 09/575,159, 09/575,132, 09/575,123, U.S. Pat. No. 6,825,945, Ser. Nos. 09/575,130, 09/575,165, U.S. Pat. No. 6,813,039, Ser. Nos. 09/575,116, 09/575,118, 09/575,131, U.S. Pat. Nos. 6,816,274, 6,681,045, Ser. Nos. 09/575,139, 09/575,186, U.S. Pat. No. 6,728,000, Ser. Nos. 09/575,181, 09/575,145, 09/575,192, 09/575,193, 09/575,156, 09/575,183, U.S. Pat. No. 6,789,194, Ser. No. 09/575,150, U.S. Pat. Nos. 6,789,191, 6,644,642, 6,502,614, 6,622,999, 6,669,385, 6,549,935, Ser. No. 09/575,187, U.S. Pat. Nos. 6,727,996, 6,760,119, 6,591,884, 6,439,706, Ser. No. 09/575,198, U.S. Pat. Nos. 6,290,349, 6,428,155, 6,785,016, 6,870,966, Ser. No. 09/575,154, U.S. Pat. Nos. 6,822,639, 6,737,591, Ser. No. 09/575,129, U.S. Pat. Nos. 6,830,196, 6,832,717, Ser. Nos. 09/575,189, 09/575,162, 09/575,172, 09/575,170, 09/575,171, 09/575,161, U.S. Pat. Nos. 6,428,133, 6,527,365 6,315,399, 6,338,548, 6,540,319, 6,328,431, 6,328,425, Ser. No. 09/575,127, U.S. Pat. Nos. 6,383,833, 6,464,332, 6,390,591, Ser. No. 09/575,152, U.S. Pat. Nos. 6,328,417, 6,409,323, 6,281,912, 6,604,810, 6,318,920, 6,488,422, 6,795,215, Ser. No. 09/575,109 U.S. Pat. No. 6,859,289

The disclosures of these co-pending applications are incorporated herein by reference.

BACKGROUND

There are many electrical and electronic devices in the home and office which have some kind of user interface for controlling their operation. These include office equipment, audio and video equipment, kitchen appliances, heating and cooling systems, etc. Even light sockets have on/off switches and sometimes dimmers, and in many countries power outlets have on/off switches.

Office equipment and entertainment equipment is increasingly networkable—i.e. devices come with interfaces to standard local-area networks, allowing their operation to be controlled over a network. The advent of standard wireless networking technologies such as Bluetooth may see an increase in networking support in such devices and appliances.

Some networking futurists predict that even light sockets will one day be networked, allowing their status to be queried and their function to be controlled remotely.

Even today, an increasing number of devices can be controlled via infrared remote control interfaces. Such interfaces are particularly prevalent on audio and video equipment and heating and cooling systems.

SUMMARY OF INVENTION

It is an objective of the present invention to provide a new method and system for enabling devices to be controlled through a computer system.

In a first aspect, the present invention provides for a method of enabling a device to be controlled in which the device is operative to perform at least one function in response to control instructions from a computer system, the method including the steps of providing a control interface containing information relating to the device function, the control interface including coded data indicative of an identity of the control interface and of at least one reference point of the control interface;

receiving, in the computer system, indicating data from a sensing device regarding the identity of the control interface and a position of the sensing device relative to the control interface, the sensing device, when placed in an operative position relative to the control interface, sensing the indicating data using at least some of the coded data; and effecting, in the computer system and from the indicating data, an operation relating to at least one parameter of the control instructions.

In a second aspect, the present invention provides for a method of enabling a device to be controlled in which the device is operative to perform at least one function in response to control instructions from a computer system, the method including the steps of providing a control interface containing information relating to the device function, the control interface including coded data indicative of at least one parameter of the control instructions;

receiving, in the computer system, data from a sensing device relating to said at least one parameter and regarding movement of the sensing device relative to the control interface, the sensing device, when moved relative to the control interface, sensing the data regarding said at least one parameter using at least some of the coded data and generating the data regarding its own movement relative to the control interface; and interpreting, in the computer system, said movement of the sensing device as it relates to said at least one parameter.

In a third aspect, the present invention provides for a method of enabling a device to be controlled in which the device is operative to perform at least one function in response to control instructions from a computer system, the method including the steps of providing a user with a control interface including coded data indicative of an identity of the control interface;

receiving, in the computer system, data from a sensing device regarding an identity of the user and regarding the identity of the control interface, the sensing device containing the data regarding the identity of the user and sensing the data regarding the identity of the control interface using at least some of the coded data; and effecting, in the computer system and from the data regarding the identity of the user and the identity of the control instruction, an operation relating to at least one parameter of the control instructions.

In a fourth aspect, the present invention provides for a system for enabling at least one function of a device to be controlled, the system including a control interface containing information relating to the device function, the control interface including coded data indicative of an identity of the control interface and of at least one reference point of the control interface; and a computer system incorporating control instructions operative to cause said device to perform said function and operative to receive indicating data from a sensing device for effecting an operation relating to at least one parameter of the control instructions, the indicating data being indicative of the identity of the control interface and a position of the sensing device relative to the control interface, the sensing device sensing the indicating data using at least some of the coded data.

In a fifth aspect, the present invention provides for a system for enabling at least one function of a device to be controlled in response to control instructions, the system including a control interface containing information relating to the device function, the control interface including coded data indicative of at least one parameter of the control instructions; and a computer system incorporating said control instructions, and operative to receive data from a sensing device regarding said at least one parameter and regarding movement of the sensing device relative to the control interface, and for interpreting said movement of the sensing device as it relates to said at least one parameter, the sensing device, when moved relative to the control interface, sensing the data regarding said at least one parameter using at least some of the coded data and generating the data regarding its own movement relative to the control interface.

In a sixth aspect, the present invention provides for a system for enabling at least one function of a device to be controlled, the system including a control interface including coded data indicative of an identity of the control interface; and a computer system incorporating control instructions to cause said device to perform said function, and operative to receive from a sensing device data regarding an identity of the user and the identity of the control interface, and for effecting, from said received data, an operation relating to a parameter of said control instructions, the sensing device containing the data regarding the identity of the user and sensing the data regarding the identity of the control interface using at least some of the coded data.

Accordingly, the present invention provides a system and a method which utilizes one or more device control interfaces capable of interacting with a computer system to control at least one function of at least one device. Whilst the novel method and system of the present invention may be used in conjunction with a single computer system, in a particularly preferred form it is designed to operate over a computer network, such as the Internet.

Physically, the device control interface is disposed on a surface medium which may be of any suitable structure. However, in a preferred arrangement, the form comprises sheet material such as paper or the like which has the coded data printed on it and which allows it to interact with the computer system. The coded data is detectable preferably, but not exclusively, outside the visible spectrum, thereby enabling it to be machine-readable but substantially invisible to the human eye. The device control may also include visible material which provides information to a user, such as the application or purpose of the device control, and which visible information may be registered or correlate in position with the relevant hidden coded data.

The system also includes a sensing device to convey data from the device control to the computer system, and in some instances, to contribute additional data. Again, the sensing device may take a variety of forms but is preferably compact and easily portable. In one arrangement, the sensing device is configured as a pen which is designed to be able to physically mark the interactive form as well as to selectively enable the coded data from the form to be read and transmitted to the computer system. The coded data then provides control information, configured such that designation thereof by a user causes instructions to be applied to the software running on the computer system or network. Alternatively, the sensing device may be embedded in a ring, hand glove or finger glove worn by a user. It could also be embedded in custom eyewear, with interaction controlled by gaze.

The nature of the interaction between the device control interface and the sensing device and the data that each contributes to the computer system may vary. In one arrangement, the coded data on the form is indicative of the identity of the form and of at least one reference point on that form. In another embodiment, the interactive form includes coded data which is indicative of a parameter of the form, whereas the sensing device is operative to provide data regarding its own movement relative to that form to the computer system together with coded data from the form. In yet another arrangement, the form includes the coded data which at least identifies the form, and the sensing device is designed to provide, to the computer system, data based on the form coded data, and also on data which identifies the user of the device.

The system and method also preferably employs specially designed printers to print the control devices. Further these printers constitute or form part of the computer system and are designed to receive data from the sensing device. As indicated above, the system and method of the invention is ideally suited to operate over a network. In this arrangement, the printers are fully integrated into the network and allow for printing of the interactive forms on demand and also for distributing of the forms using a mixture of multi-cast and point-cast communication protocols.

The present invention therefore provides a novel system and method for enabling electrical or electronic devices to be controlled through a computer system making use of novel interactive surface media. The invention is applicable where a particular device is able to be remotely controlled, either via a network interface or an infrared interface. In these circumstaces it is possible to completely separate the user interface to the device from the device itself and the user interface can then be implemented in the forms mentioned above and sensed by a sensing device carried by the user.

The device control interface preferably identifies the device, and is printed with the user interface of the device in the form of buttons etc. Being passive, the surface gives no feedback to the user as to the status of the device or its user interface. Feedback can, however, be provided via the sensing device if necessary. The computer system resolves operations on the control interface with reference to a user interface structure previously selected by the user from the device itself or its manufacturer, or designed by the user using elements provided by the device or its manufacturer.

User interfaces implemented in this way have several advantages:

once the infrastructure is in place, the cost of manufacturing the user interface is removed from the cost of manufacturing each particular device; as an example, even the cost of the traditional user interface to a light socket (i.e. both the wiring and the switch) is non-trivial;

a user interface can be replicated by simply printing another copy when a user interface becomes damaged it can be easily replaced when the firmware in a device is updated, a new user interface can be easily provided a user interface can be customized by arranging elements and printing the result a user interface with a particular style can be chosen from an available set; for example, some users may prefer larger icons or a simplified function set multiple user interfaces can be grouped together a user interface can be provided on the device itself by the same means; i.e. pre-printed and attached to the device, or printed directly onto the device surface access to individual user interfaces and functions can be controlled, since each sensing device is tied to a particular user's identity.

As one example, a device control interface according to a preferred aspect of the invention can be printed onto or attached to the surface of a toy to provide the user interface to the toy. An appropriate sensing device can then be used to interact with the user interface, communicating by wire or wirelessly to either a personal computer, game console, or a processor embedded in the toy itself, to produce graphical output, sound effects and other behavior. For example, a toy sit-in submarine may have a large user interface containing dozens of submarine controls. The toy comes with a CD-ROM containing an associated interactive game which runs on a PC or game console. The game is driven by the user interface contained in the submarine, perhaps mediated by a sensing device in the form of a glove which communicates wirelessly by Bluetooth with standard Bluetooth hardware in the PC or game console. The PC screen or console-connected television monitor provides the animated part of the user interface. The device control interface provides the extended user interface. Toys can be customized by selecting different user interfaces and custom user interfaces can be created by assembling pre-defined user interface components.

BRIEF DESCRIPTION OF DRAWINGS

Preferred and other embodiments of the invention will now be described, by way of non-limiting example only, with reference to the accompanying drawings, in which:

FIG. 5c is a plan view showing an arrangement of nine of the tags shown in FIG. 5a where targets are shared between adjacent tags;

FIG. 5d is a plan view showing the interleaving and rotation of the symbols of the four codewords of the tag shown in FIG. 5a;

FIG. 23 is a schematic view of a universal remote control form;

FIG. 29 is a schematic view of a set defaults form; and

DETAILED DESCRIPTION OF PREFERRED AND OTHER EMBODIMENTS

Note: Memjet™ is a trademark of Silverbrook Research Pty Ltd, Australia.

In the preferred embodiment, the invention is configured to work with the netpage networked computer system, a summary of which is given below and a detailed description of which is given in our earlier applications, including in particular applications U.S. Ser. No. 09/575,129, U.S. Ser. No. 09/575,171, U.S. Ser. No. 09/575,155, U.S. Ser. No. 09/575,195 and U.S. Ser. No. 09/575,141. It will be appreciated that not every implementation will necessarily embody all or even most of the specific details and extensions described in these applications in relation to the basic system. However, the system is described in its most complete form to assist in understanding the context in which the preferred embodiments and aspects of the present invention operate.

In brief summary, the preferred form of the netpage system employs a computer interface in the form of a mapped surface, that is, a physical surface which contains references to a map of the surface maintained in a computer system. The map references can be queried by an appropriate sensing device. Depending upon the specific implementation, the map references may be encoded visibly or invisibly, and defined in such a way that a local query on the mapped surface yields an unambiguous map reference both within the map and among different maps. The computer system can contain information about features on the mapped surface, and such information can be retrieved based on map references supplied by a sensing device used with the mapped surface. The information thus retrieved can take the form of actions which are initiated by the computer system on behalf of the operator in response to the operator's interaction with the surface features.

In its preferred form, the netpage system relies on the production of, and human interaction with, netpages. These are pages of text, graphics and images printed on ordinary paper or other media, but which work like interactive web pages. Information is encoded on each page using ink which is substantially invisible to the unaided human eye. The ink, however, and thereby the coded data, can be sensed by an optically imaging pen and transmitted to the netpage system.

In the preferred form, active buttons and hyperlinks on each page can be clicked with the pen to request information from the network or to signal preferences to a network server. In one embodiment, text written by hand on a netpage is automatically recognized and converted to computer text in the netpage system, allowing forms to be filled in. In other embodiments, signatures recorded on a netpage are automatically verified, allowing e-commerce transactions to be securely authorized.

Figure 1:
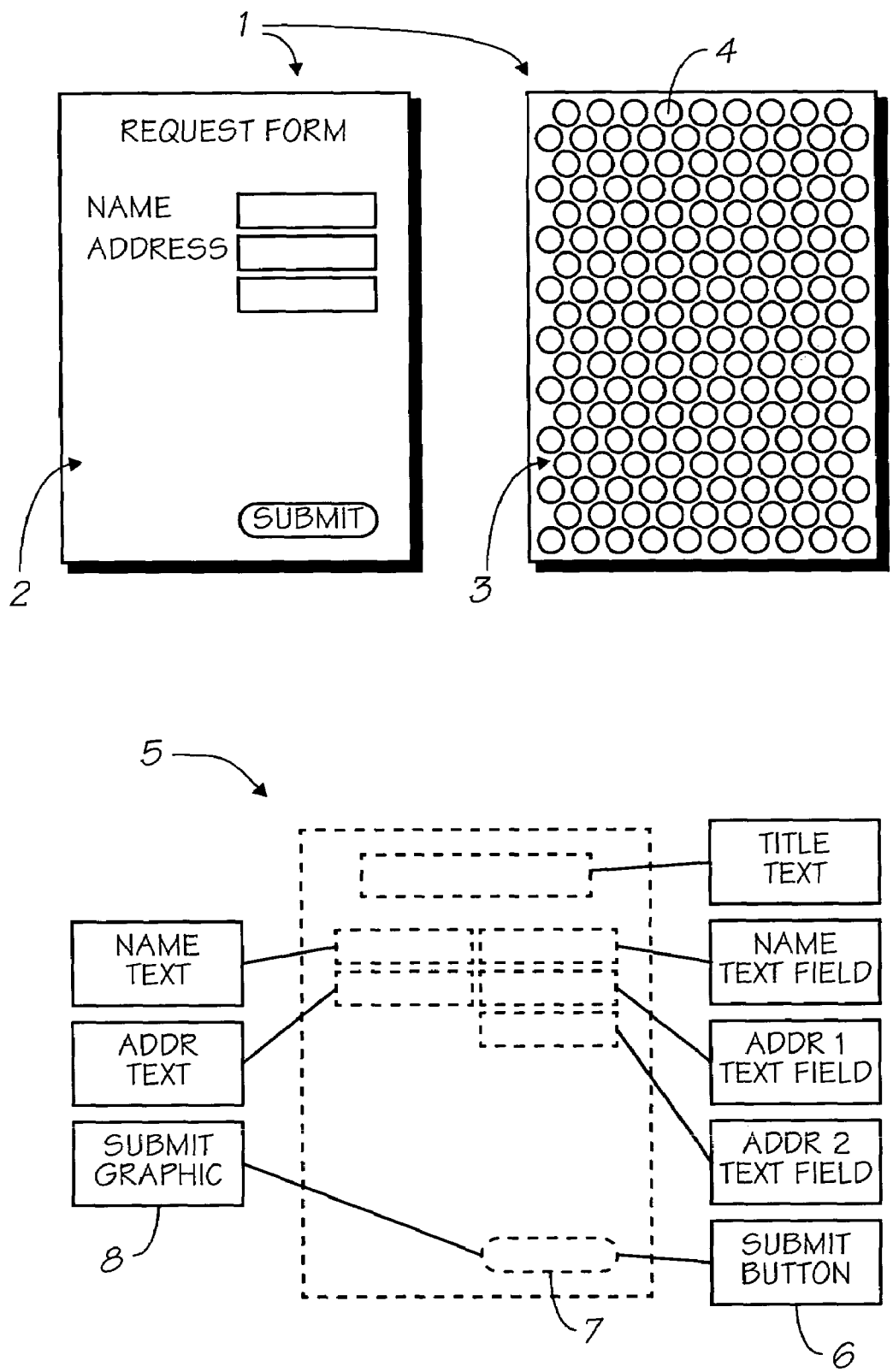
FIG. 1 is a schematic of a the relationship between a sample printed netpage and its online page description.

As illustrated in FIG. 1, a printed netpage 1 can represent a interactive form which can be filled in by the user both physically, on the printed page, and "electronically", via communication between the pen and the netpage system. The example shows a "Request" form containing name and address fields and a submit button. The netpage consists of graphic data 2 printed using visible ink, and coded data 3 printed as a collection of tags 4 using invisible ink. The corresponding page description 5, stored on the netpage network, describes the individual elements of the netpage. In particular it describes the type and spatial extent (zone) of each interactive element (i.e. text field or button in the example), to allow the netpage system to correctly interpret input via the netpage. The submit button 6, for example, has a zone 7 which corresponds to the spatial extent of the corresponding graphic 8.

Figure 2:
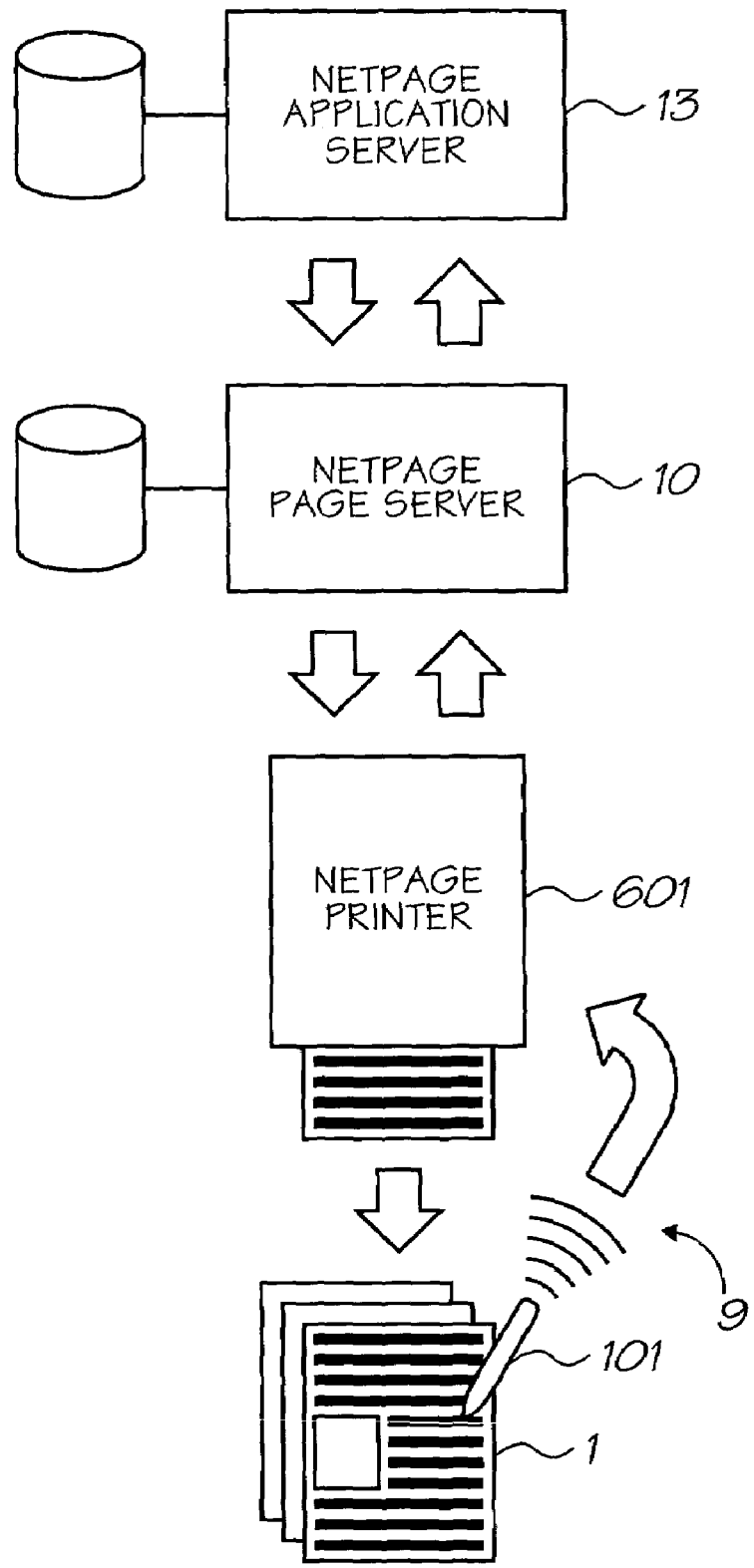
FIG. 2 is a schematic view of a interaction between a netpage pen, a netpage printer, a netpage page server, and a netpage application server.

As illustrated in FIG. 2, the netpage pen 101, a preferred form of which is described in our earlier application U.S. Ser. No. 09/575,174, works in conjunction with a netpage printer 601, an Internet-connected printing appliance for home, office or mobile use. The pen is wireless and communicates securely with the netpage printer via a short-range radio link 9.

The netpage printer 601, preferred forms of which are described in our earlier application U.S. Ser. No. 09/575,155 and our co-filed application U.S. Ser. No. 09/693,514, is able to deliver, periodically or on demand, personalized newspapers, magazines, catalogs, brochures and other publications, all printed at high quality as interactive netpages. Unlike a personal computer, the netpage printer is an appliance which can be, for example, wall-mounted adjacent to an area where the morning news is first consumed, such as in a user's kitchen, near a breakfast table, or near the household's point of departure for the day. It also comes in tabletop, desktop, portable and miniature versions.

Netpages printed at their point of consumption combine the ease-of-use of paper with the timeliness and interactivity of an interactive medium.

As shown in FIG. 2, the netpage pen 101 interacts with the coded data on a printed netpage 1 and communicates, via a short-range radio link 9, the interaction to a netpage printer. The printer 601 sends the interaction to the relevant netpage page server 10 for interpretation. In appropriate circumstances, the page server sends a corresponding message to application computer software running on a netpage application server 13. The application server may in turn send a response which is printed on the originating printer.

The netpage system is made considerably more convenient in the preferred embodiment by being used in conjunction with high-speed microelectromechanical system (MEMS) based inkjet (Memjet™) printers, for example as described in our earlier application U.S. Ser. No. 09/575,141. In the preferred form of this technology, relatively high-speed and high-quality printing is made more affordable to consumers. In its preferred form, a netpage publication has the physical characteristics of a traditional newsmagazine, such as a set of letter-size glossy pages printed in full color on both sides, bound together for easy navigation and comfortable handling.

The netpage printer exploits the growing availability of broadband Internet access. The netpage printer can also operate with slower connections, but with longer delivery times and lower image quality. The netpage system can also be enabled using existing consumer inkjet and laser printers, although the system will operate more slowly and will therefore be less acceptable from a consumer's point of view. In other embodiments, the netpage system is hosted on a private intranet. In still other embodiments, the netpage system is hosted on a single computer or computer-enabled device, such as a printer.

Netpage publication servers 14 on the netpage network are configured to deliver print-quality publications to netpage printers. Periodical publications are delivered automatically to subscribing netpage printers via pointcasting and multicasting Internet protocols. Personalized publications are filtered and formatted according to individual user profiles.

A netpage printer can be configured to support any number of pens, and a pen can work with any number of netpage printers. In the preferred implementation, each netpage pen has a unique identifier. A household may have a collection of colored netpage pens, one assigned to each member of the family. This allows each user to maintain a distinct profile with respect to a netpage publication server or application server.

A netpage pen can also be registered with a netpage registration server 11 and linked to one or more payment card accounts. This allows e-commerce payments to be securely authorized using the netpage pen. The netpage registration server compares the signature captured by the netpage pen with a previously registered signature, allowing it to authenticate the user's identity to an e-commerce server. Other biometrics can also be used to verify identity. A version of the netpage pen includes fingerprint scanning, verified in a similar way by the netpage registration server.

Although a netpage printer may deliver periodicals such as the morning newspaper without user intervention, it can be configured never to deliver unsolicited junk mail. In its preferred form, it only delivers periodicals from subscribed or otherwise authorized sources. In this respect, the netpage printer is unlike a fax machine or e-mail account which is visible to any junk mailer who knows the telephone number or e-mail address.

Each object model in the system is described using a Unified Modeling Language (UML) class diagram. A class diagram consists of a set of object classes connected by relationships, and two kinds of relationships are of interest here: associations and generalizations. An association represents some kind of relationship between objects, i.e. between instances of classes. A generalization relates actual classes, and can be understood in the following way: if a class is thought of as the set of all objects of that class, and class A is a generalization of class B, then B is simply a subset of A. Each class is drawn as a rectangle labelled with the name of the class. It contains a list of the attributes of the class, separated from the name by a horizontal line, and a list of the operations of the class, separated from the attribute list by a horizontal line. In the class diagrams which follow, however, operations are never modelled. An association is drawn as a line joining two classes, optionally labelled at either end with the multiplicity of the association. The default multiplicity is one. An asterisk (*) indicates a multiplicity of "many", i.e. zero or more. Each association is optionally labelled with its name, and is also optionally labelled at either end with the role of the corresponding class. An open diamond indicates an aggregation association ("is-part-of"), and is drawn at the aggregator end of the association line. A generalization relationship ("is-a") is drawn as a solid line joining two classes, with an arrow (in the form of an open triangle) at the generalization end. When a class diagram is broken up into multiple diagrams, any class which is duplicated is shown with a dashed outline in all but the main diagram which defines it. It is shown with attributes only where it is defined.

Netpages are the foundation on which a netpage network is built. They provide a paper-based user interface to published information and interactive services. A netpage consists of a printed page (or other surface region) invisibly tagged with references to an online description of the page. The online page description is maintained persistently by a netpage page server. The page description describes the visible layout and content of the page, including text, graphics and images. It also describes the input elements on the page, including buttons, hyperlinks, and input fields. A netpage allows markings made with a netpage pen on its surface to be simultaneously captured and processed by the netpage system.

Multiple netpages can share the same page description. However, to allow input through otherwise identical pages to be distinguished, each netpage is assigned a unique page identifier. This page ID has sufficient precision to distinguish between a very large number of netpages.

Each reference to the page description is encoded in a printed tag. The tag identifies the unique page on which it appears, and thereby indirectly identifies the page description. The tag also identifies its own position on the page. Characteristics of the tags are described in more detail below.

Tags are printed in infrared-absorptive ink on any substrate which is infrared-reflective, such as ordinary paper. Near-infrared wavelengths are invisible to the human eye but are easily sensed by a solid-state image sensor with an appropriate filter.

A tag is sensed by an area image sensor in the netpage pen, and the tag data is transmitted to the netpage system via the nearest netpage printer. The pen is wireless and communicates with the netpage printer via a short-range radio link. Tags are sufficiently small and densely arranged that the pen can reliably image at least one tag even on a single click on the page. It is important that the pen recognize the page ID and position on every interaction with the page, since the interaction is stateless. Tags are error-correctably encoded to make them partially tolerant to surface damage.

The netpage page server maintains a unique page instance for each printed netpage, allowing it to maintain a distinct set of user-supplied values for input fields in the page description for each printed netpage.

Figure 3:
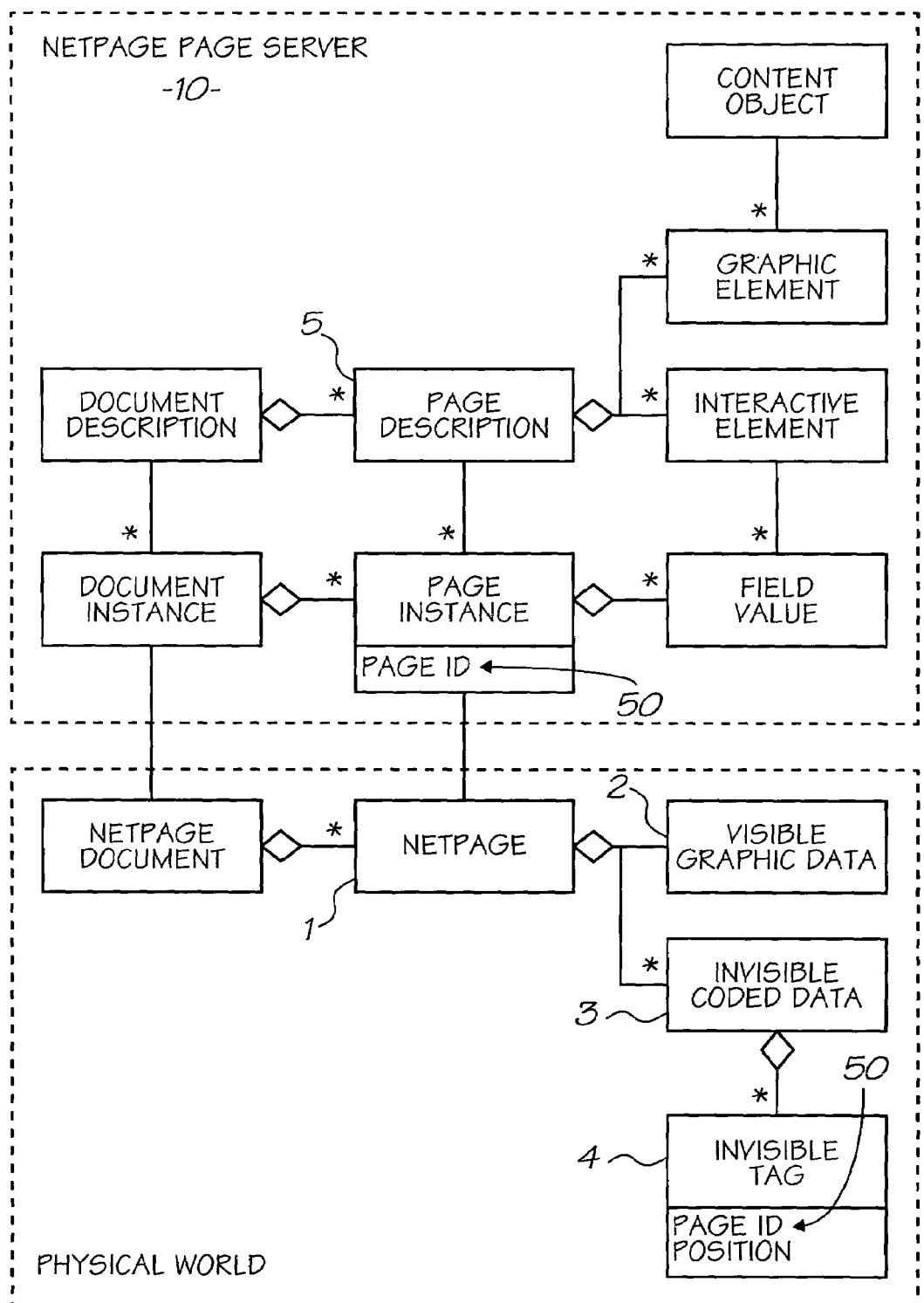
FIG. 3 is a schematic view of a high-level structure of a printed netpage and its online page description.

The relationship between the page description, the page instance, and the printed netpage is shown in FIG. 3. The printed netpage may be part of a printed netpage document 45. The page instance is associated with both the netpage printer which printed it and, if known, the netpage user who requested it.

In a preferred form, each tag identifies the region in which it appears, and the location of that tag within the region. A tag may also contain flags which relate to the region as a whole or to the tag. One or more flag bits may, for example, signal a tag sensing device to provide feedback indicative of a function associated with the immediate area of the tag, without the sensing device having to refer to a description of the region. A netpage pen may, for example, illuminate an "active area" LED when in the zone of a hyperlink.

In a preferred embodiment, each tag contains an easily recognized invariant structure which aids initial detection, and which assists in minimizing the effect of any warp induced by the surface or by the sensing process. The tags preferably tile the entire page, and are sufficiently small and densely arranged that the pen can reliably image at least one tag even on a single click on the page. It is important that the pen recognize the page ID and position on every interaction with the page, since the interaction is stateless.

In a preferred embodiment, the region to which a tag refers coincides with an entire page, and the region ID encoded in the tag is therefore synonymous with the page ID of the page on which the tag appears. In other embodiments, the region to which a tag refers can be an arbitrary subregion of a page or other surface. For example, it can coincide with the zone of an interactive element, in which case the region ID can directly identify the interactive element.

Each tag contains typically contains 16 bits of tag ID, at least 90 bits of region ID, and a number of flag bits. Assuming a maximum tag density of 64 per square inch, a 16-bit tag ID supports a region size of up to 1024 square inches. Larger regions can be mapped continuously without increasing the tag ID precision simply by using abutting regions and maps. The distinction between a region ID and a tag ID is mostly one of convenience. For most purposes the concatenation of the two can be considered as a globally unique tag ID. Conversely, it may also be convenient to introduce structure into the tag ID, for example to define the x and y coordinates of the tag. A 90-bit region ID allows $2^{90}$ (~$10^{27}$ or a thousand trillion trillion) different regions to be uniquely identified. Tags may also contain type information, and a region may be tagged with a mixture of tag types. For example, a region may be tagged with one set of tags encoding x coordinates and another set, interleaved with the first, encoding y coordinates.

In one embodiment, 120 bits of tag data are redundantly encoded using a (15, 5) Reed-Solomon code. This yields 360 encoded bits consisting of 6 codewords of 15 4-bit symbols each. The (15, 5) code allows up to 5 symbol errors to be corrected per codeword, i.e. it is tolerant of a symbol error rate of up to 33% per codeword. Each 4-bit symbol is represented in a spatially coherent way in the tag, and the symbols of the six codewords are interleaved spatially within the tag. This ensures that a burst error (an error affecting multiple spatially adjacent bits) damages a minimum number of symbols overall and a minimum number of symbols in any one codeword, thus maximising the likelihood that the burst error can be fully corrected.

Any suitable error-correcting code code can be used in place of a (15, 5) Reed-Solomon code, for example a Reed-Solomon code with more or less redundancy, with the same or different symbol and codeword sizes; another block code; or a different kind of code, such as a convolutional code (see, for example, Stephen B. Wicker, Error Control Systems for Digital Communication and Storage, Prentice-Hall 1995, the contents of which a herein incorporated by cross-reference).

Figure 4A:
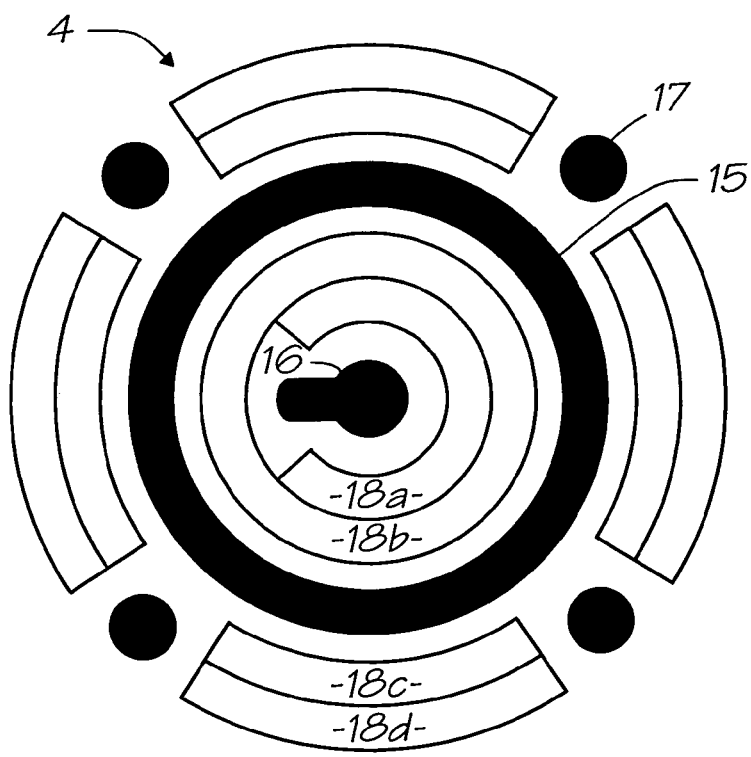
FIG. 4a is a plan view showing a structure of a netpage tag.

One embodiment of the physical representation of the tag, shown in FIG. 4a and described in our earlier application U.S. Ser. No. 09/575,129 includes fixed target structures 15, 16, 17 and variable data areas 18. The fixed target structure allow a sensing device such as the netpage pen to detect the tag and infer its three-dimensional orientation relative to the sensor. The data areas contain representations of the individual bits of the encoded tag data. To maximise its size, each data bit is represented by a radial wedge in the form of an area bounded by two radial lines and two concentric circular arcs. Each wedge has a minimum dimension of 8 dots at 1600 dpi and is designed so that its base (its inner arc), is at least equal to this minimum dimension. The height of the wedge in the radial direction is always equal to the minimum dimension. Each 4-bit data symbol is represented by an array of 2×2 wedges. The fifteen 4-bit data symbols of each of the six codewords are allocated to the four concentric symbol rings 18a to 18d in interleaved fashion. Symbols are allocated alternately in circular progression around the tag. The interleaving is designed to maximise the average spatial distance between any two symbols of the same codeword.

Figure 4B:
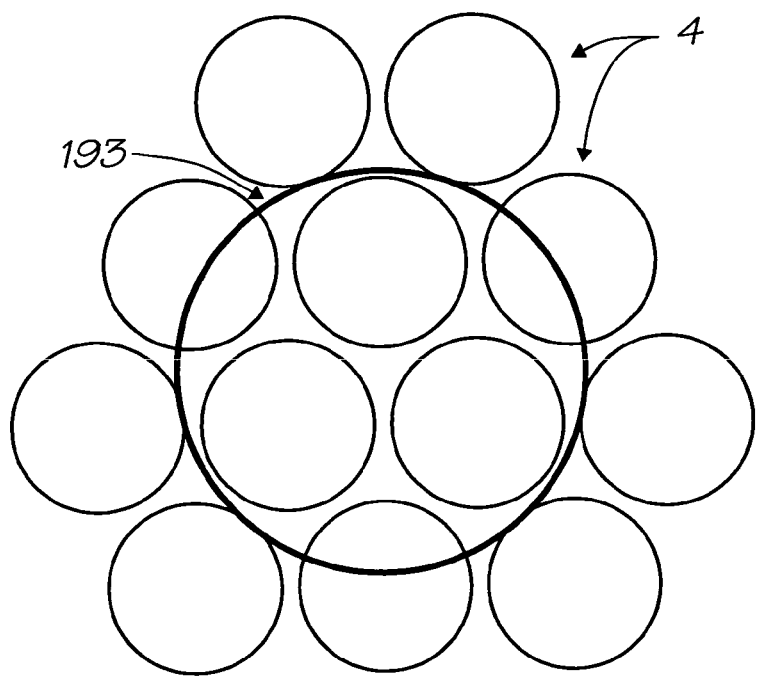
FIG. 4b is a plan view showing a relationship between a set of the tags shown in FIG. 4a and a field of view of a netpage sensing device in the form of a netpage pen.

In order to support "single-click" interaction with a tagged region via a sensing device, the sensing device must be able to see at least one entire tag in its field of view no matter where in the region or at what orientation it is positioned. The required diameter of the field of view of the sensing device is therefore a function of the size and spacing of the tags. Assuming a circular tag shape, the minimum diameter of the sensor field of view 193 is obtained when the tags are tiled on a equilateral triangular grid, as shown in FIG. 4b.

The tag structure just described is designed to allow both regular tilings of planar surfaces and irregular tilings of non-planar surfaces. Regular tilings are not, in general, possible on non-planar surfaces. In the more usual case of planar surfaces where regular tilings of tags are possible, i.e. surfaces such as sheets of paper and the like, more efficient tag structures can be used which exploit the regular nature of the tiling.

Figure 5A:
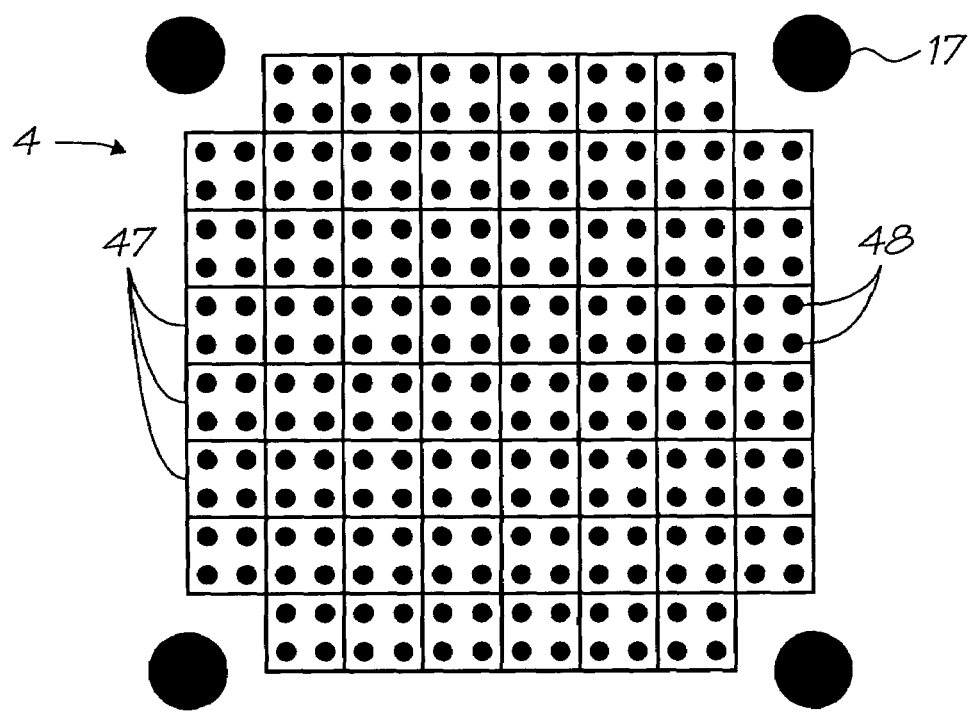
FIG. 5a is a plan view showing an alternative structure of a netpage tag.
Figure 5B:
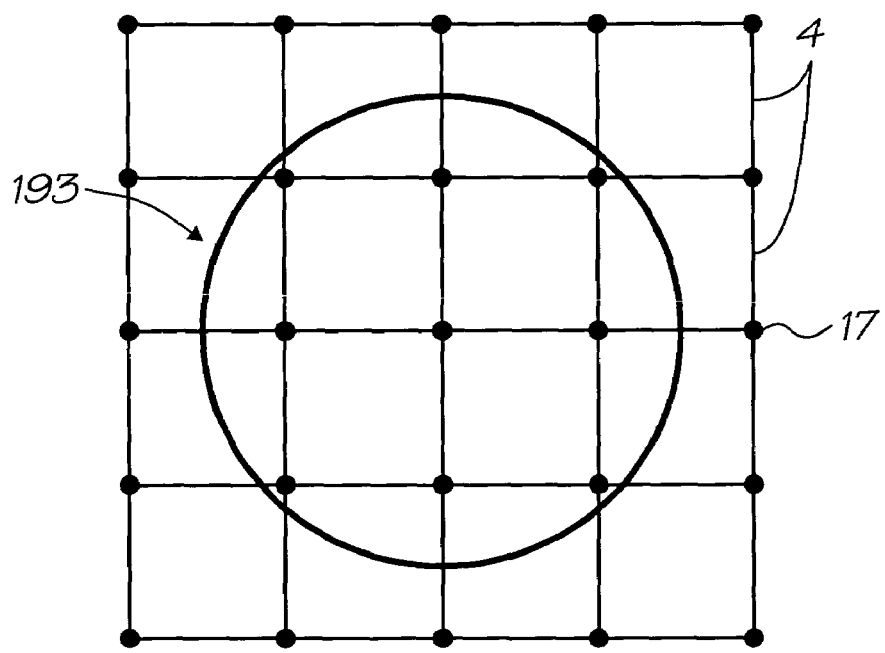
FIG. 5b is a plan view showing a relationship between a set of the tags shown in FIG. 5a and a field of view of a netpage sensing device in the form of a netpage pen.
Figures 5C, 5D:
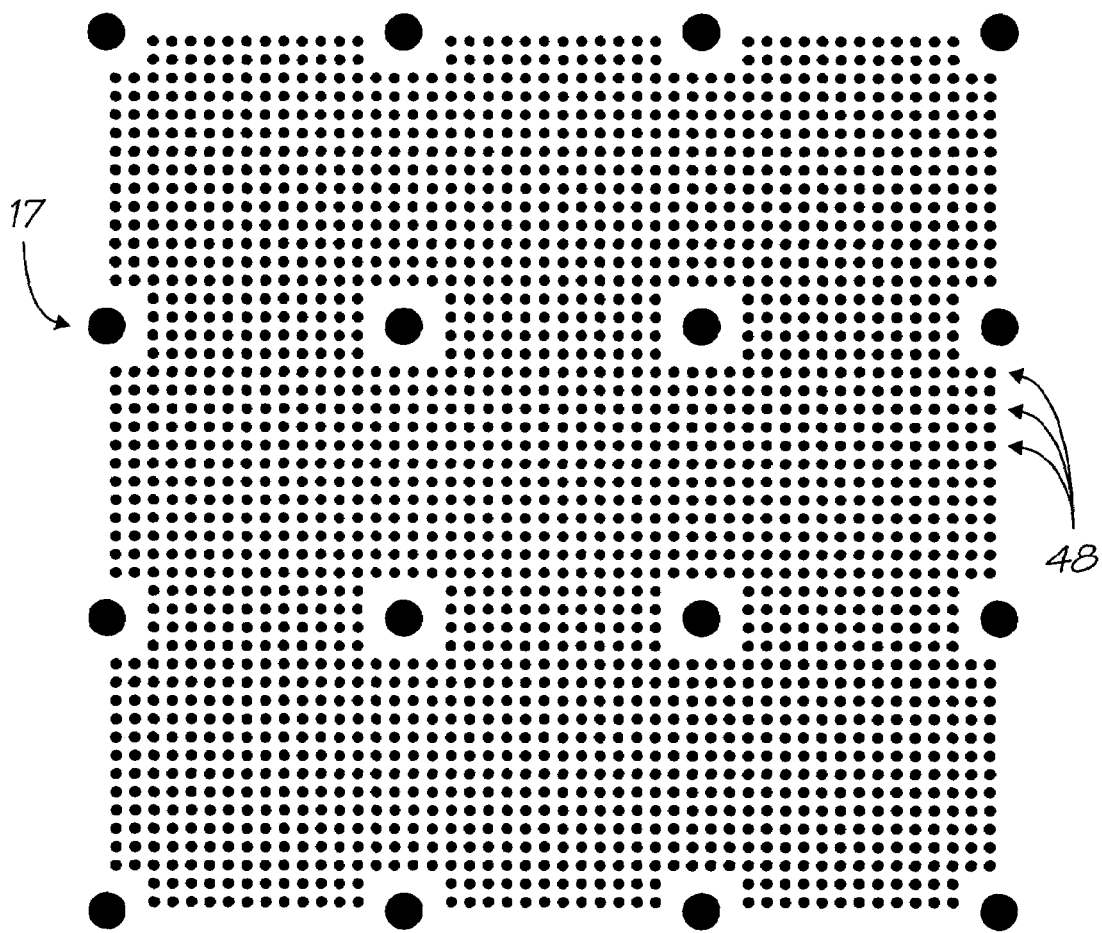

An alternative tag structure more suited to a regular tilting is shown in FIG. 5a. The tag 4 is square and has four perspective targets 17. It is similar in structure to tags described by Van de Grift et al. in U.S. Pat. No. 5,051,746. The tag represents sixty 4-bit Reed-Solomon symbols 47, for a total of 240 bits. The tag represents each one bit as a dot 48, and each zero bit by the absence of the corresponding dot. The perspective targets are designed to be shared between adjacent tags, as shown in FIGS. 5b and 5c. FIG. 5b shows a square tilting of 16 tags and the corresponding minimum field of view 193, which must span the diagonals of two tags. FIG. 5c shows a square tilting of nine tags, containing all one bits for illustration purposes.

Using a (15, 7) Reed-Solomon code, 112 bits of tag data are redundantly encoded to produce 240 encoded bits. The four codewords are interleaved spatially within the tag to maximize resilience to burst errors. Assuming a 16-bit tag ID as before, this allows a region ID of up to 92 bits. The data-bearing dots 48 of the tag are designed to not overlap their neighbors, so that groups of tags cannot produce structures which resemble targets. This also saves ink. The perspective targets therefore allow detection of the tag, so further targets are not required.

Although the tag may contain an orientation feature to allow disambiguation of the four possible orientations of the tag relative to the sensor, it is also possible to embed orientation data in the tag data. For example, the four codewords can be arranged so that each tag orientation contains one codeword placed at that orientation, as shown in FIG. 5d, where each symbol is labelled with the number of its codeword (1–4) and the position of the symbol within the codeword (A-O). Tag decoding then consists of decoding one codeword at each orientation. Each codeword can either contain a single bit indicating whether it is the first codeword, or two bits indicating which codeword it is. The latter approach has the advantage that if, say, the data content of only one codeword is required, then at most two codewords need to be decoded to obtain the desired data. This may be the case if the region ID is not expected to change within a stroke and is thus only decoded at the start of a stroke. Within a stroke only the codeword containing the tag ID is then desired. Furthermore, since the rotation of the sensing device changes slowly and predictably within a stroke, only one codeword typically needs to be decoded per frame.

It is possible to dispense with perspective targets altogether and instead rely on the data representation being self-registering. In this case each bit value (or multi-bit value) is typically represented by an explicit glyph, i.e. no bit value is represented by the absence of a glyph. This ensures that the data grid is well-populated, and thus allows the grid to be reliably identified and its perspective distortion detected and subsequently corrected during data sampling. To allow tag boundaries to be detected, each tag data must contain a marker pattern, and these must be redundantly encoded to allow reliable detection. The overhead of such marker patterns is similar to the overhead of explicit perspective targets. One such scheme uses dots positioned a various points relative to grid vertices to represent different glyphs and hence different multi-bit values (see Anoto Technology Description, Anoto April 2000).

Decoding a tag results in a region ID, a tag ID, and a tag-relative pen transform. Before the tag ID and the tag-relative pen location can be translated into an absolute location within the tagged region, the location of the tag within the region must be known. This is given by a tag map, a function which maps each tag ID in a tagged region to a corresponding location. A tag map reflects the scheme used to tile the surface region with tags, and this can vary according to surface type. When multiple tagged regions share the same tiling scheme and the same tag numbering scheme, they can also share the same tag map. The tag map for a region must be retrievable via the region ID. Thus, given a region ID, a tag ID and a pen transform, the tag map can be retrieved, the tag ID can be translated into an absolute tag location within the region, and the tag-relative pen location can be added to the tag location to yield an absolute pen location within the region.

The tag ID may have a structure which assists translation through the tag map.

It may, for example, encoded cartesian coordinates or polar coordinates, depending on the surface type on which it appears. The tag ID structure is dictated by and known to the tag map, and tag IDs associated with different tag maps may therefore have different structures.

Two distinct surface coding schemes are of interest, both of which use the tag structure described earlier in this section. The preferred coding scheme uses "location-indicating" tags as already discussed. An alternative coding scheme uses "object-indicating" (or "function-indicating") tags.

A location-indicating tag contains a tag ID which, when translated through the tag map associated with the tagged region, yields a unique tag location within the region. The tag-relative location of the pen is added to this tag location to yield the location of the pen within the region. This in turn is used to determine the location of the pen relative to a user interface element in the page description associated with the region. Not only is the user interface element itself identified, but a location relative to the user interface element is identified. Location-indicating tags therefore trivially support the capture of an absolute pen path in the zone of a particular user interface element.

An object-indicating (or function-indicating) tag contains a tag ID which directly identifies a user interface element in the page description associated with the region (or equivalently, a function). All the tags in the zone of the user interface element identify the user interface element, making them all identical and therefore indistinguishable. Object-indicating tags do not, therefore, support the capture of an absolute pen path. They do, however, support the capture of a relative pen path. So long as the position sampling frequency exceeds twice the encountered tag frequency, the displacement from one sampled pen position to the next within a stroke can be unambiguously determined. As an alternative, the netpage pen 101 can contain a pair or motion-sensing accelerometers, as described in our earlier application U.S. Ser. No. 09/575,174.

With either tagging scheme, the tags function in cooperation with associated visual elements on the netpage as user interactive elements in that a user can interact with the printed page using an appropriate sensing device in order for tag data to be read by the sensing device and for an appropriate response to be generated in the netpage system.

Each application user interface flow is illustrated as a collection of documents linked by command arrows. A command arrow indicates that the target document is printed as a result of the user pressing the corresponding command button on the source page. Some command arrows are labelled with multiple commands separated by slashes ('/'s), indicating that any one of the specified commands causes the target document to be printed. Although multiple commands may label the same command arrow, they typically have different side-effects.

Figures 6, 7:
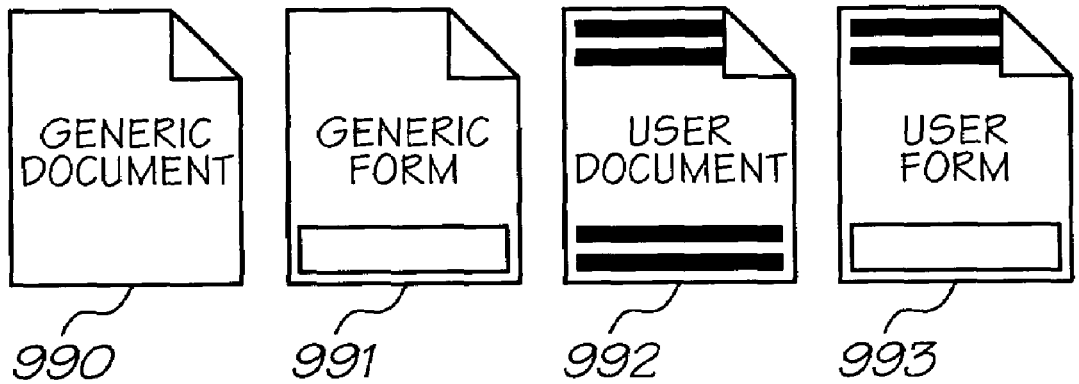
FIG. 6 is a schematic view of a set of user interface flow document icons.
FIG. 7 is a schematic view of a set of user interface page layout element icons.

In application terms, it is important to distinguish between netpage documents and netpage forms. Documents contain printed information, as well as command buttons which can be pressed by the user to request further information or some other action. Forms, in addition to behaving like normal documents, also contain input fields which can be filled in by the user. They provide the system with a data input mechanism. It is also useful to distinguish between documents which contain generic information and documents which contain information specific to a particular interaction between the user and an application. Generic documents may be pre-printed publications such as magazines sold at news stands or advertising posters encountered in public places. Forms may also be pre-printed, including, for example, subscription forms encountered in pre-printed publications. They may, of course, also be generated on-the-fly by a netpage printer in response to user requests. User-specific documents and forms are normally generated on the fly by a netpage printer in response to user requests. FIG. 6 shows a generic document 990, a generic form 991, a user-specific document 992, and a user-specific form 993.

Netpages which participate in a user interface flow are further described by abstract page layouts. A page layout may contain various kinds of elements, each of which has a unique style to differentiate it from the others. As shown in FIG. 7, these include fixed information 994, variable information 995, input fields 996, command buttons 997, draggable commands 998, and text hyperlinks or hypertext links 999.

When a user interface flow is broken up into multiple diagrams, any document which is duplicated is shown with dashed outlines in all but the main diagram which defines it.

8. Device Controls using the Netpage™ System

The netpage system, then provides the facility to control electrical or electronic devices. If a particular device can be remotely controlled, either via a network interface or an infrared interface, then it is possible to completely separate the user interface to the device from the device itself. Furthermore, the user interface can then be implemented as a netpage, sensed by a netpage sensing device carried by the user. The netpage sensing device should ideally be small, unobtrusive and portable. The netpage pen provides one possible form factor. Alternatively, the netpage sensing device might be embedded in a ring, hand glove or finger glove worn by the user. It could also be embedded in custom eyewear, with interaction controlled by gaze.

The netpage identifies the device, and is printed with the user interface of the device in the form of buttons etc. Being passive, the surface giveds no feedback to the user as to the status of the device or its user interface. Feedback can, however, be provided via the sensing device if necessary. The netpage base station (e.g. the netpage Printer) resolves operations on the netpage with reerence to a user interface structure previosuly selected by the user from the device itself or its manufacturer, or designed by the user using elements provided by the device or its manufacturer.

The following illustrates the concepts of a netpage device control in detail by way of a netpage device control application for audio and video equipment. Although specific reference is made to a netpage pen, any netpage sensing device can be used. Similarly, although specific reference is made to a netpage printer, any netpage base station can be used, i.e. any device which receives input from a netpage sensing device and either interprets the input directly or forwards the input to one or more network servers for interpretation.

Device Control

The netpage system provides a mechanism for controlling devices such as television receivers, VCRs and video-on-demand units.

A netpage can contain printed control buttons in the style of a remote control unit, or printed playback control buttons associated with individual programs or movies. Playback controls can include play, pause, stop, start and end. An iconic image of the program or movie can itself act as a play button.

Consumer disk-based video recorders are now available which support simultaneous recording and playback. They allow buffered viewing of broadcast video and provide some of the advantages of video-on-demand. A daily newspaper delivered via the netpage system can contain links to broadcast news video captured in this way some time before delivery of the newspaper, perhaps under control of the netpage printer.

With broadcast television, a printed netpage program listing can provide a useful interface to a collection of television channels, particularly if one or more channels are being buffered by a disk-based video recorder. With true video-on-demand, a printed netpage catalog can provide a useful interface to a video library.

The netpage pen can be augmented to work as an infrared remote control. Commands generated by pen interactions with printed video playback controls can also be sent directly from the netpage printer to the video device, by wired or wireless control interface, including infrared and radio (e.g. Bluetooth).

In the netpage system device control services are provided by one or more device control applications running on servers distributed on the network. User interactions with device control netpages are routed to the appropriate device control application via the appropriate page server using normal netpage mechanisms.

Figure 8:
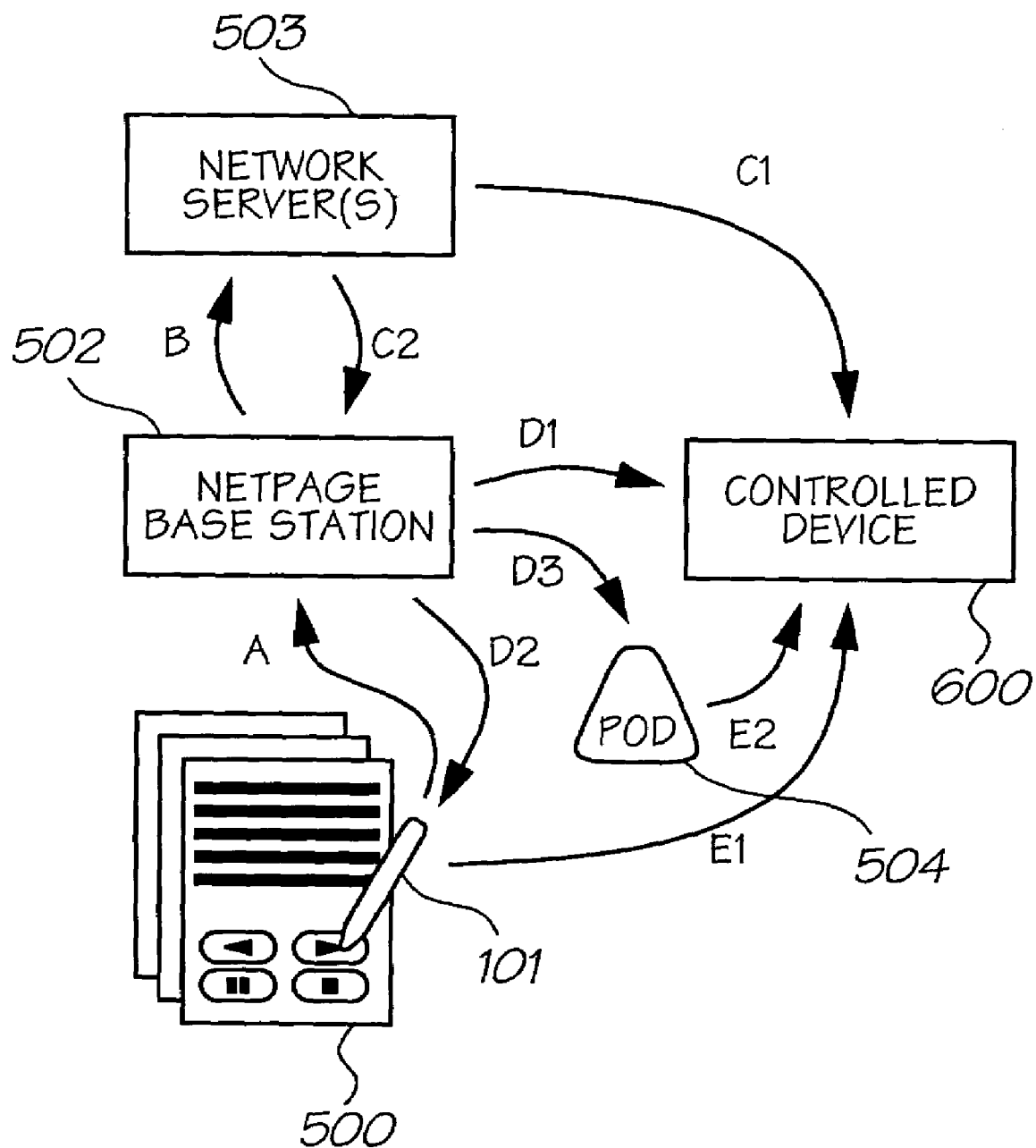
FIG. 8 is a schematic view of device control interactions.

Various device control interaction scenarios are illustrated in FIG. 8. When a user invokes a device function on a device control netpage 500, the input is sent from the user's netpage pen 101 to the user's netpage printer 802, in the usual way (A). The input is relayed to the application 503 in the usual way (B). On receipt of the input, the application identifies the designated device 600 and determines the specified device command. If the designated device 600 is directly accessible to an application, then the application may send the command code directly to the device (C1). This may be the case if the device is connected to a network accessible to the application 503, e.g. a wired or wireless wide-area network. Otherwise the application may send the command code to the originating printer 802 (C2). The printer 802 may be modified to be receptive to device control commands sent to it by a device control application. If the designated device 600 is directly accessible to the printer 802, then the printer may send the command code directly to the device (D1). This may be the case if the device is connected to a network accessible to the printer, e.g. a wired or wireless wide-area or local-area network, or if the printer and device can communicate directly by wire or wirelessly. Otherwise the printer 502 may send the command code to the originating pen 101 (D2). The pen 101 may be modified to be receptive to device control commands sent to it by a printer 502. The pen may be augmented with an infrared transmitter, allowing it to transmit the command code to the device (E1). This requires the pen's infrared transmitter to be in line of sight of the device's infrared receiver. As an alternative to sending the command code to the pen 101, the printer 502 may instead send the command code to a remote control "pod" 504 (D3). This is a device which is installed within line of sight of the device 600. It can communicate with the printer by wire or wirelessly, and incorporates an infrared transmitter, allowing it to transmit the command code to the device 600 (E2). Because the pod 504 may be placed in a location which gives it a guaranteed view of a number of devices, it provides a useful alternative to augmenting the pen 101.

Device Control Object Model

Figure 9:
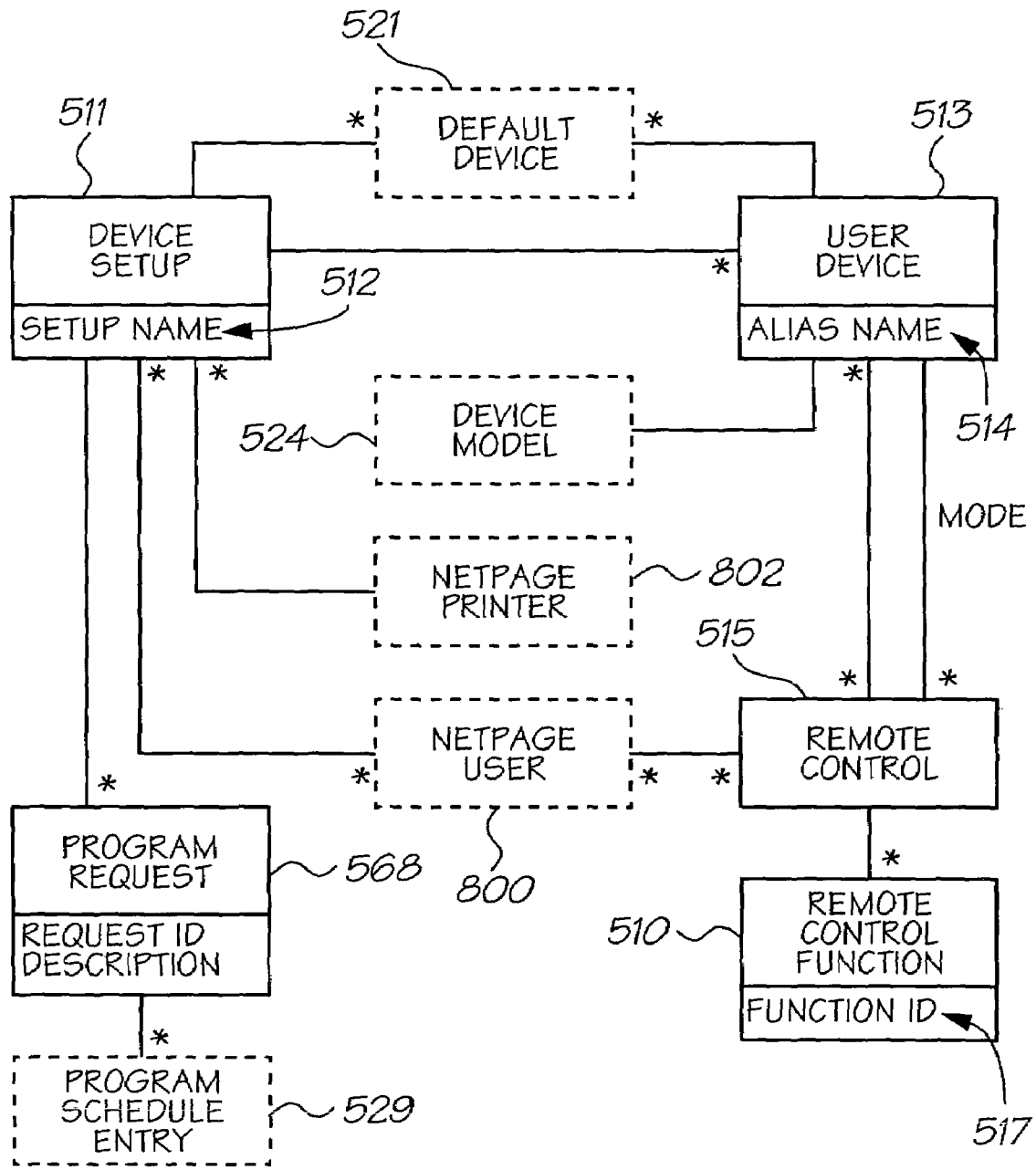
FIG. 9 is a schematic view of a device control class diagram.

The Device Control object model revolves around devices and device setups maintained for particular netpage users in relation to particular netpage printers. The Device Control class diagram is shown in FIG. 9.

Each netpage user 800 has one or more device setups 511. A user may have a separate device setup 511 for each netpage printer 802 they have access to. For example, a user 800 may have one device setup 511 at home and another at their office. Each device setup 511 has a name 512 assigned by the user. Each device setup 511 may have one or more users, but each user 800 only has access to one device setup 511 per printer 802.

A device setup 511 has a number of user devices 513 associated with it, one for each device 600 the user can control. Each user device 513 has an alias name 514 assigned by the user, and has associated with it the manufacturer's device model information.

Figure 13:
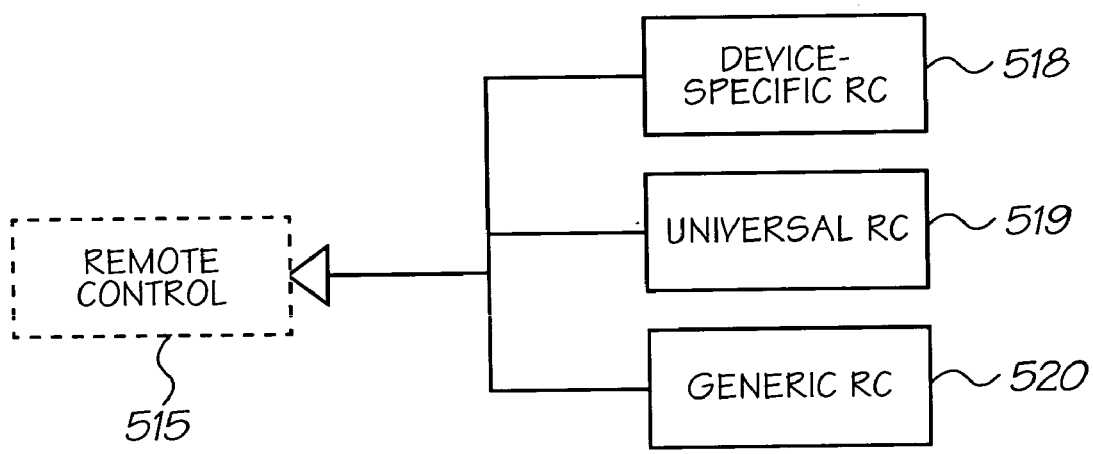
FIG. 13 is a schematic view of a remote control class diagram.
Figure 14:
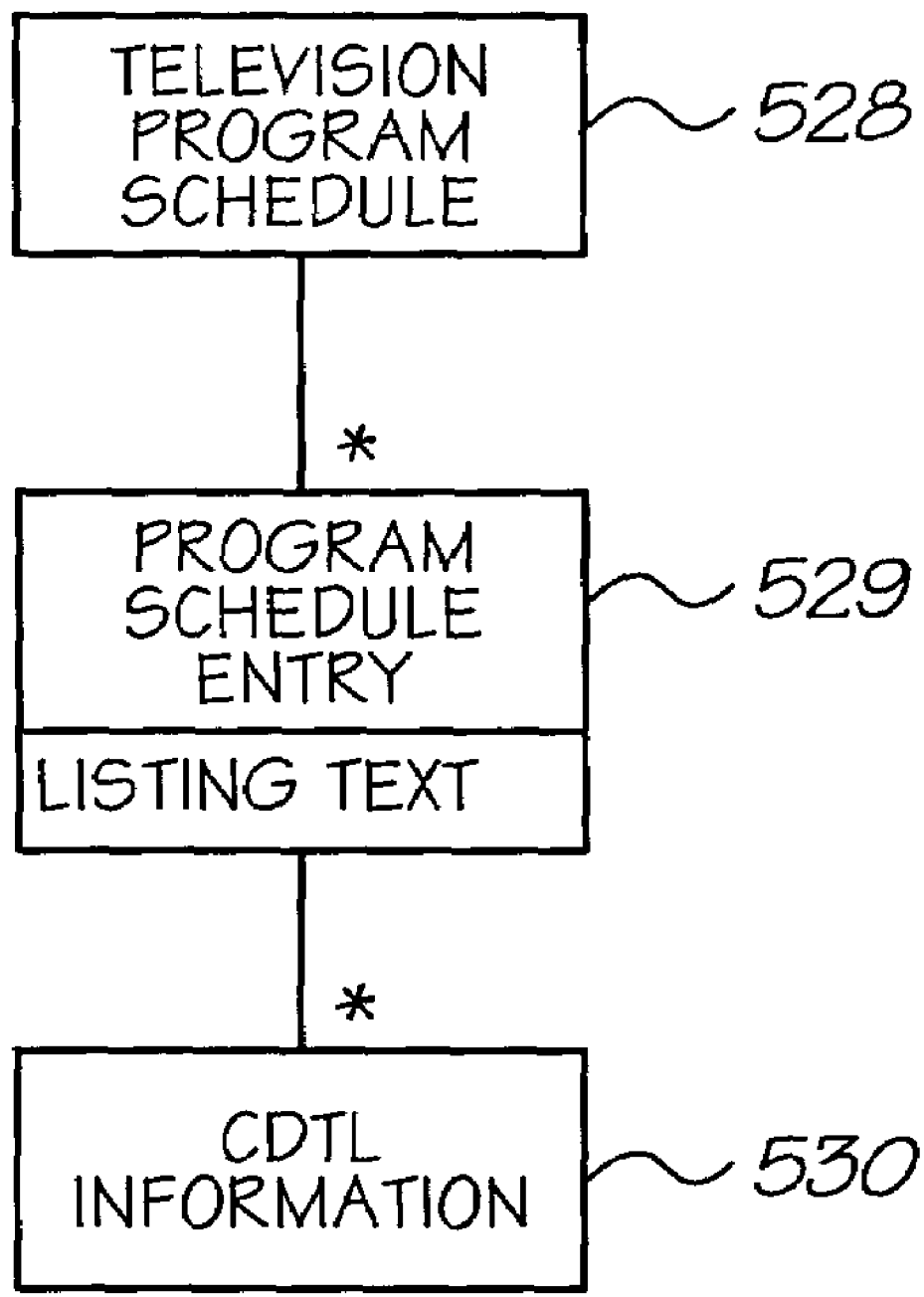
FIG. 14 is a schematic view of a program schedule class diagram.

Each device 513 can have a number of remote controls 515. A remote control can be used by any user 800 authorized for the device setup 511. A remote control 515 has a number of remote control functions 510 associated with it, each with a function identifier 517. The function identifier 517 is used to look up the control code 565 for the function from the manufacturer 568. A remote control 515 may be device specific 518, universal 519 (i.e. control more than one device), or generic 520. The Remote Control class diagram is shown in FIG. 13.

A device-specific remote control 518 only operates the user device for which it was printed.

A universal remote control (URC) 519 may operate several devices within the device setup 511. The user selects a device 513 on the URC 519 to change the URC mode and thereby to choose which device is current. The URC 519 typically only operates one device in each mode.

Figure 10:
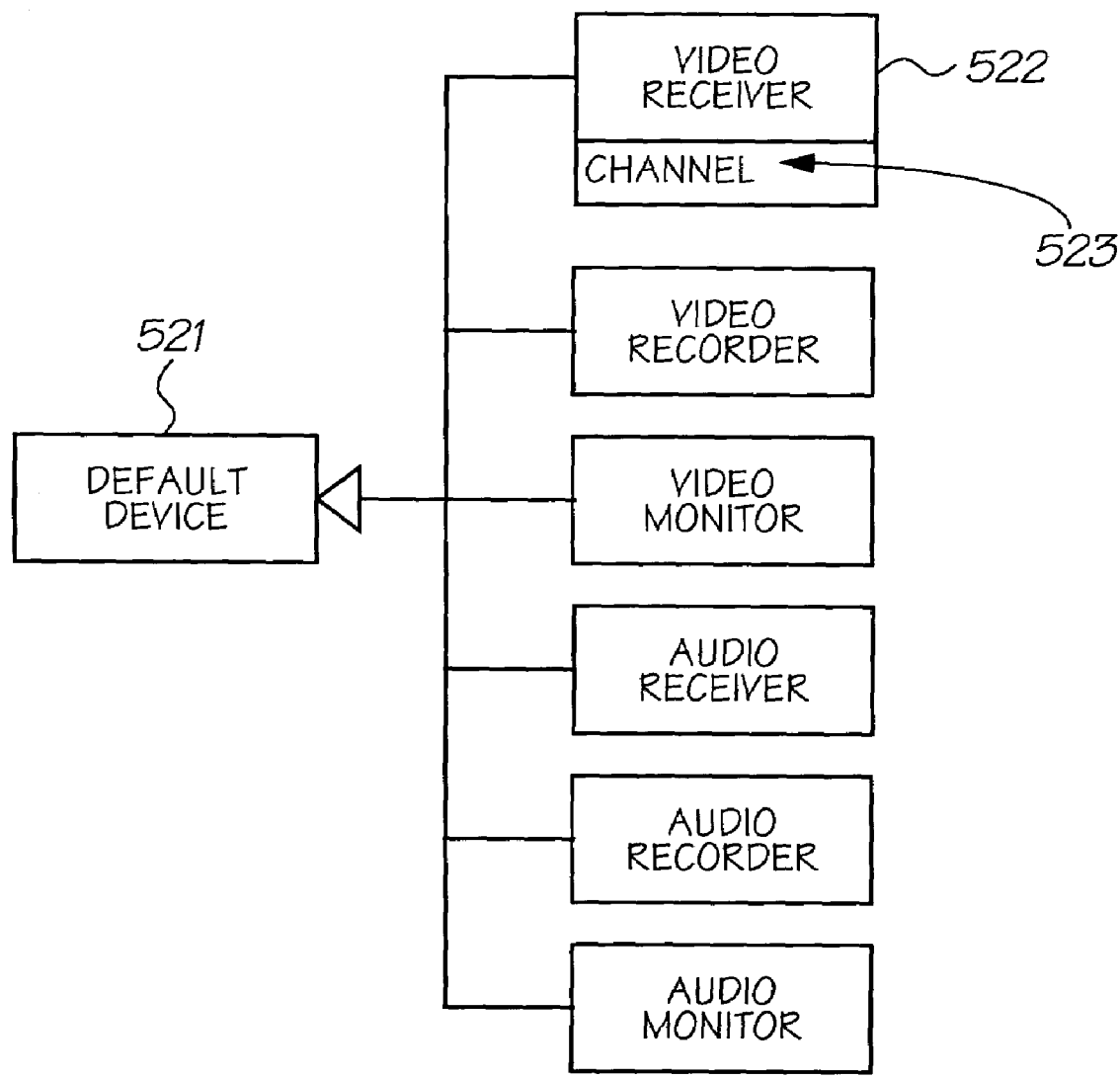
FIG. 10 is a schematic view of a default device class diagram.

A generic remote control 520 can operate any device 569 for any user. A generic remote control 520 may be printed in a netpage publication such as a television program. A generic remote control 520 operates the default devices 521 in the device setup 511. If, for example, a household has more than one television the remote control 520 will only operate the default television. For each device type, if no default device 521 has been specified by the user then the first device of the relevant type added by the user is automatically made the default. A default video receiver 522 may be specified for a specific broadcast channel 523. This can be useful where one channel can be received on several of the user's devices 513. The Default Device class diagram is shown in FIG. 10.

When adding a device 569 to their device setup 511 the user 800 must specify the manufacturer 568, device type and model of the device 524.

Figure 11:
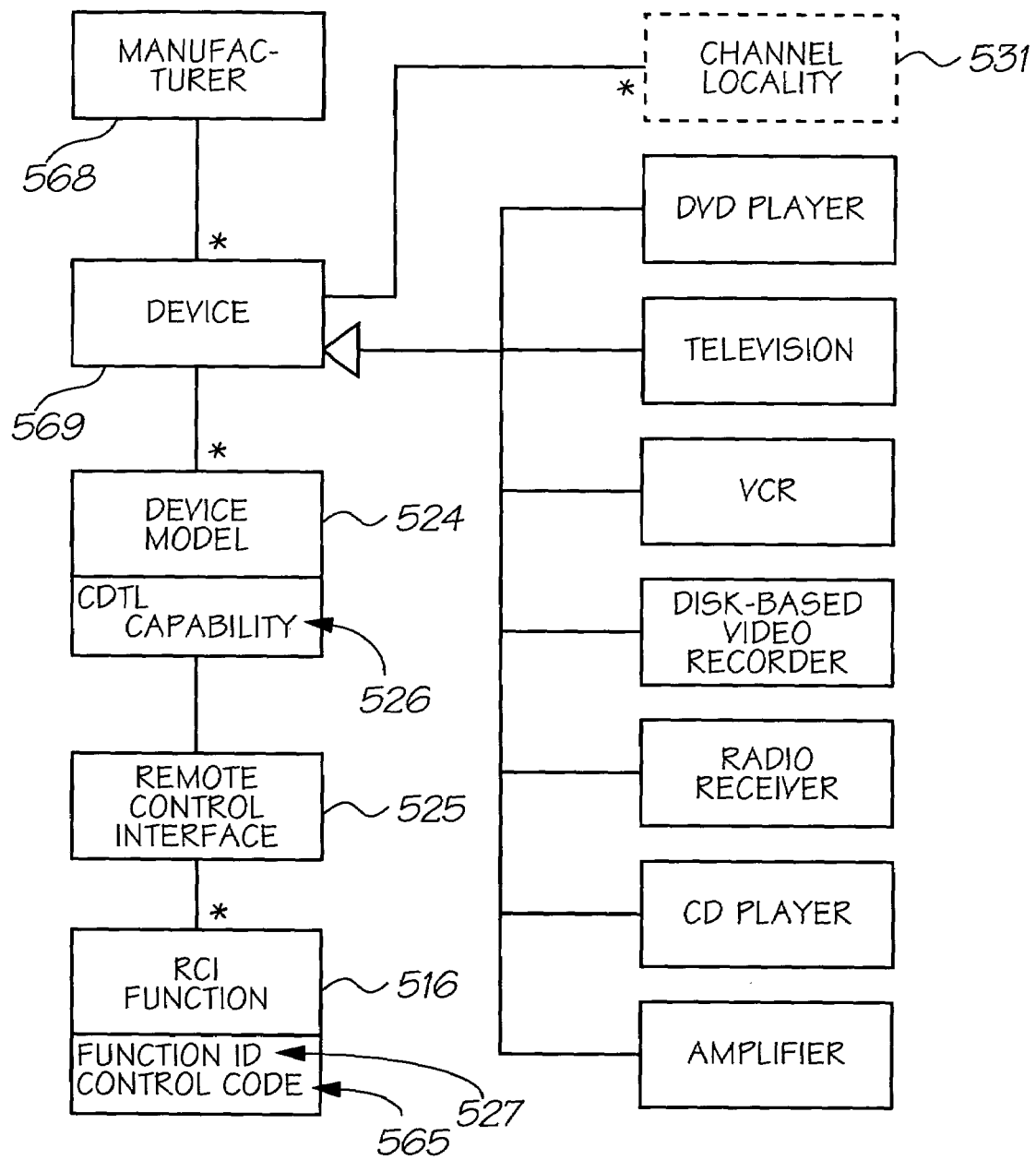
FIG. 11 is a schematic view of a device information class diagram.
Figure 12:
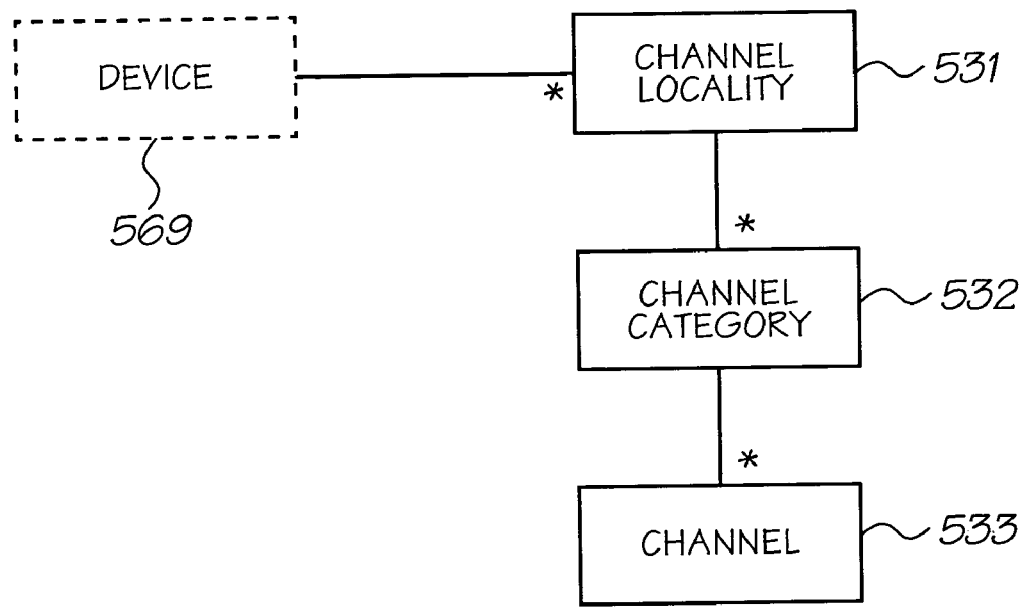
FIG. 12 is a schematic view of a device channel class diagram.

Each manufacturer 568 has a number of devices 569 and each device 569 has a number of models 524. Each device model 524 has associated with it a remote control interface 525, and information about the device's channel, date, time and length of program (CDTL) programming capability 526. The remote control interface 525 contains information about the remote control functions 516 available for the device 569. Each remote control interface (RCI) function 516 has a function identifier 527 and the control code 565 to perform the function. The CDTL capability 526 specifies the information that can be programmed for the device. For example, a VCR can be programmed with CDTL information, whereas a cable television receiver may only be able to be programmed with channel, date and time (CDT) information. The Device information class diagram is shown in FIG. 11.

Figure 15:
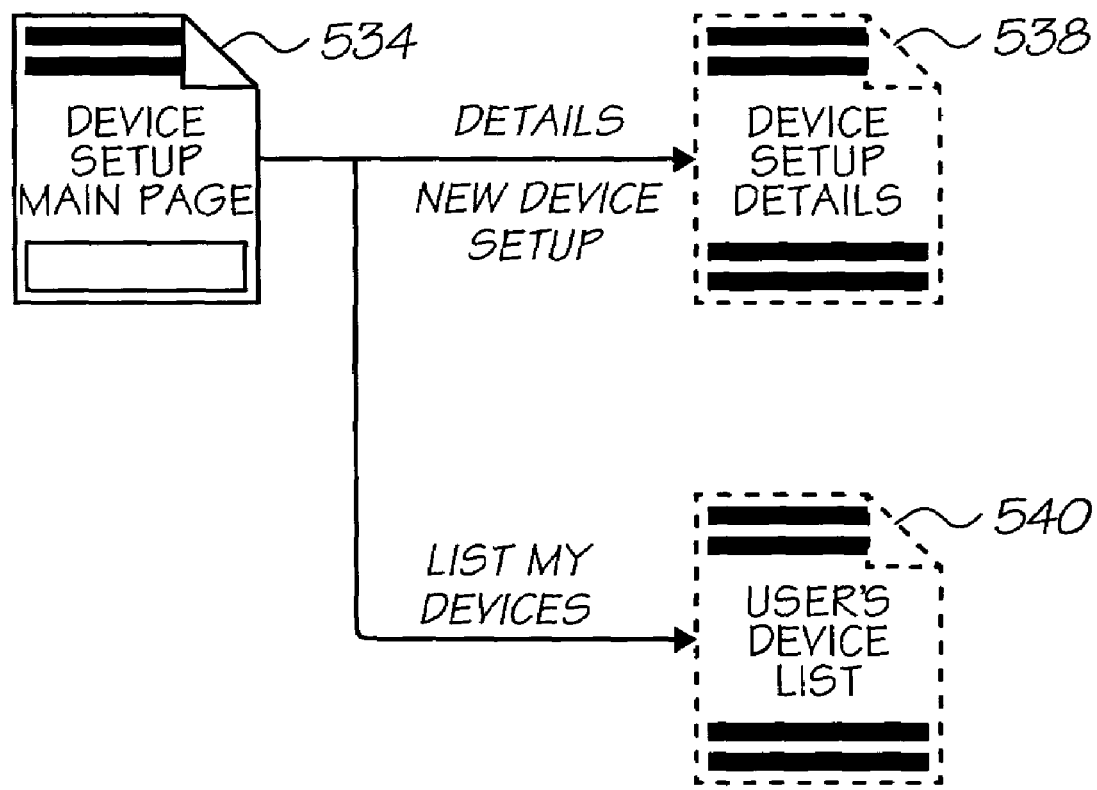
FIG. 15 is a schematic view of a device setup user interface flow.

Each device setup 511 may have associated with it a number of program requests 568. A program request 568 is created when a user 800 requests a video broadcast program to be recorded. A published television program schedule 528 contains a number of entries 529, one for each television program to be broadcast. Associated with each entry is one or more CDTL information 530 records containing the channel, date, time and program length information for the broadcast. This information can then be used to control the user devices 513 for unattended recording of broadcast television programs. The Program Schedule class diagram is shown in FIG. 15.

The Device Channel class diagram is illustrated in FIG. 13. Each device 569 may have associated with it channel locality information 531, describing the broadcast channels available within a given locality. These may be divided into channel categories 532, e.g. free-to-air, cable, etc.

The user may receive a given broadcast channel 533 through several of their devices, for example free-to-air broadcasts may be available through the television, VCR, and cable box. Optionally, the user has the ability to define a default video receiver device for each channel 533. If the user elects, via a program schedule, to record a program on a channel which is available through several of the user's devices, then the default video receiver, as specified in the user's device setup 511, is used.

Device Control User Interface

The user 800 typically obtains the netpage Device Setup main page 534 from the Device Control application's entry in the netpage system application catalog, obtained via the netpage printer's help page. The user may also bookmark the page and subsequently obtain it via their favorites list, or obtain it via their history list.

Figure 16:
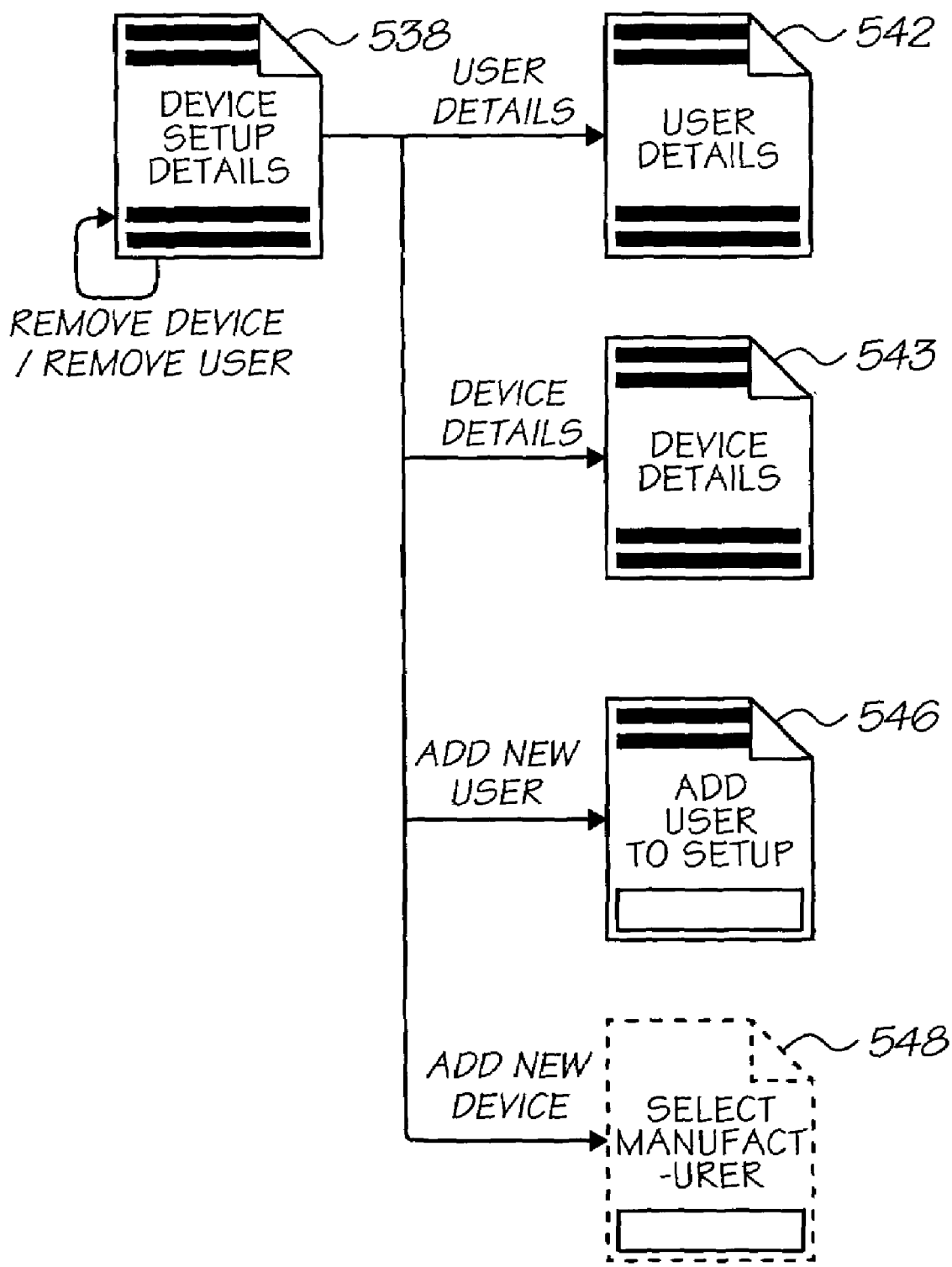
FIG. 16 is a schematic view of a setup details user interface flow.

The Device Control user interface flow is shown in FIG. 16.

Device Setup Main Page

Figure 21:
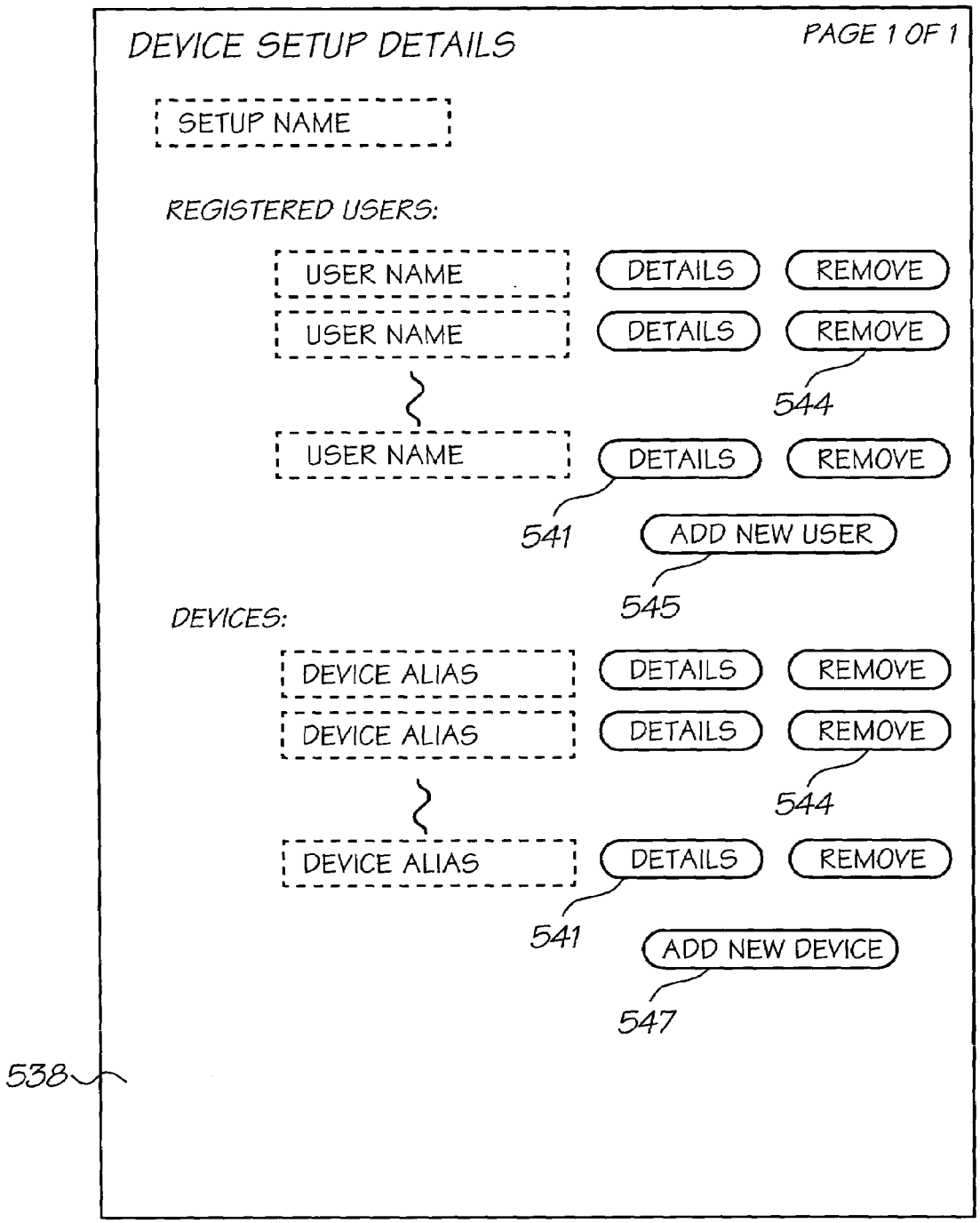
FIG. 21 is a schematic view of a device setup details.

The Device Setup main page 534, shown in FIG. 21, lists the device setups for the current netpage printer 802, and the users registered for each setup. If the privileges setting on the printer is not enabled then all device setups for the printer are listed. If the privileges setting is enabled then only those device setups that the user is authorized to see are listed. If the user is a system administrator then all device setups are listed.

To print the details for a particular device setup the user presses the <Details> button 535 next to the desired setup. To create a new device setup, the user enters a setup name 536 and presses the <New Device Setup> button 537. Both actions print a Device Setup Details page 538.

The user can press <List My Devices> 539 to print a Device List page 540 for the user's own device setup. The Device Setup user interface flow is shown in FIG. 16.

Figure 22:
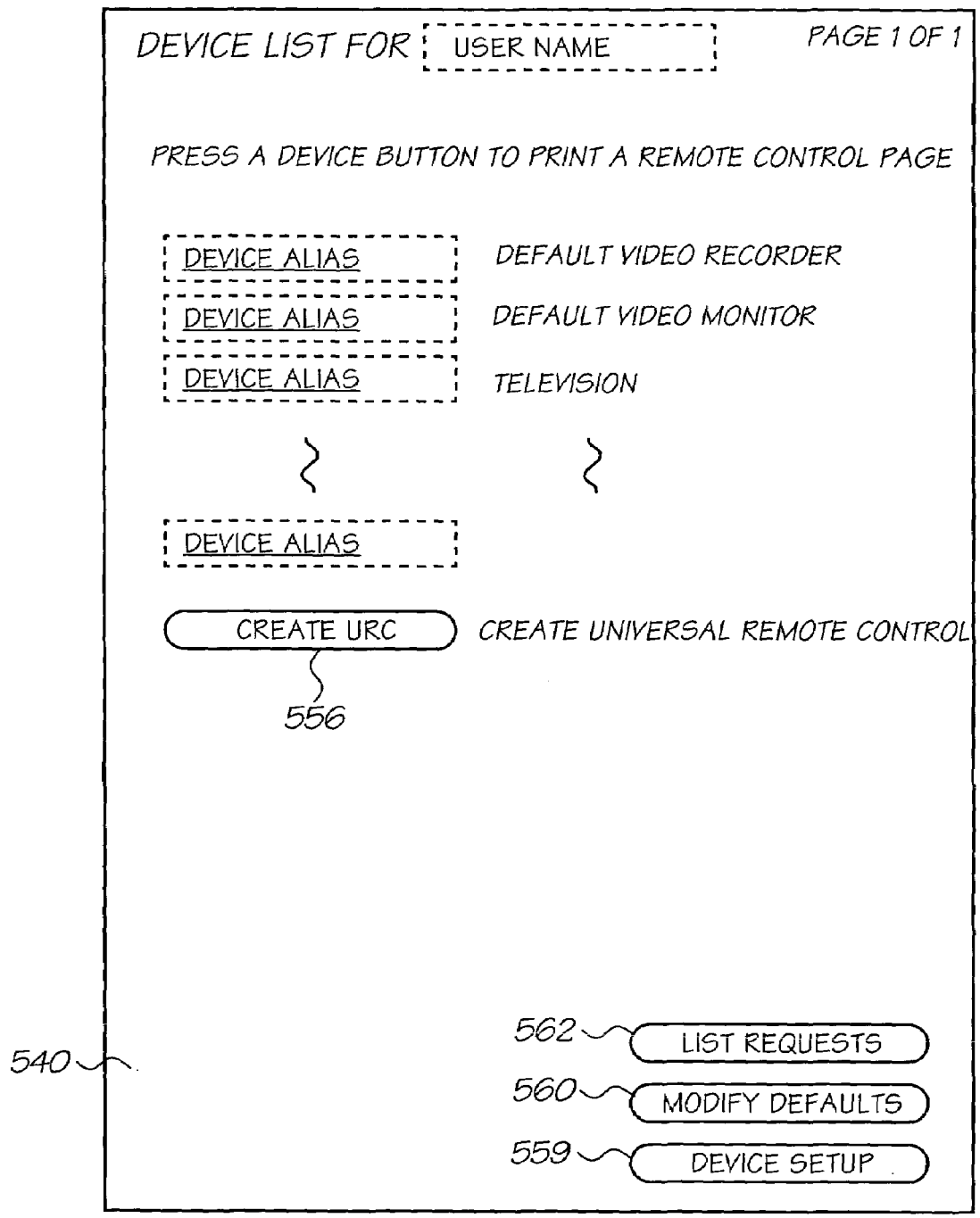
FIG. 22 is a schematic view of a device list.

The Device Setup Details page 538, shown in FIG. 22, lists all the registered users and devices for a device setup. If the device setup is new, then no registered users or devices are listed.

The user can print the full details of a registered user or device by pressing the <Details> 541 button next to the desired entry. For a user entry a User Details page 542 is printed. For a device entry a Device Details page 543 is printed showing the device manufacturer, device type, model, device alias, and the default devices to which this device is assigned.

The user can remove a user or device from the device setup 511 by pressing the <Remove> button 544 next to the appropriate entry. The Device Setup Details page 538 is reprinted with the appropriate entry removed.

The user can add a new user to the device setup by pressing the <Add New User> button 545. An Add New User form 546 is printed listing all users registered on the current printer but not included in any device setup. A user can only be included in one device setup per netpage printer.

The user can add a new device to the device setup by pressing the <Add New Device> button 547. A Select Manufacturer page 548 is printed.

Figure 17:
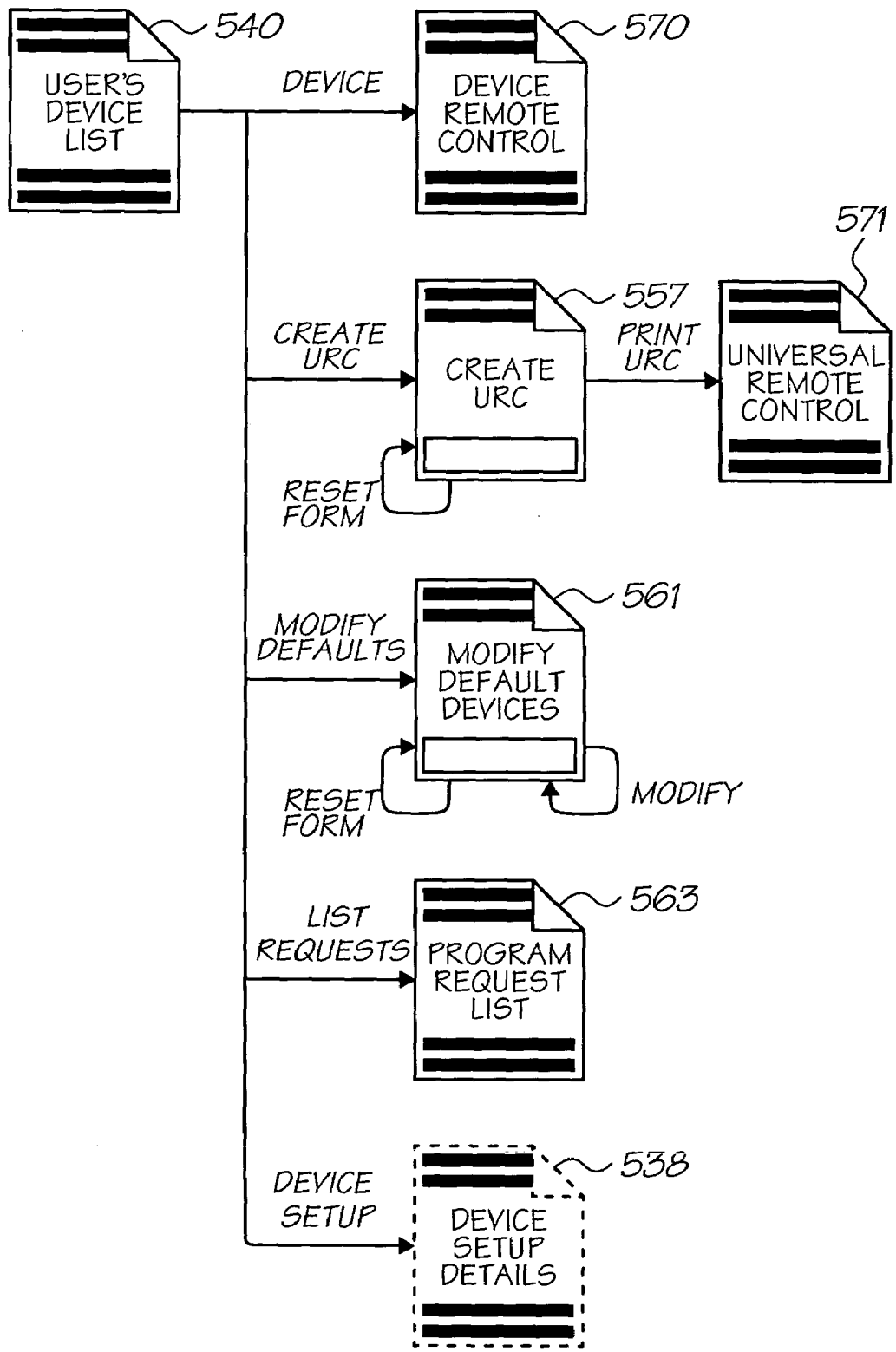
FIG. 17 is a schematic view of a device list user interface flow.

The Setup Details user interface flow is shown in FIG. 17.

Adding a New Device

Figure 27:
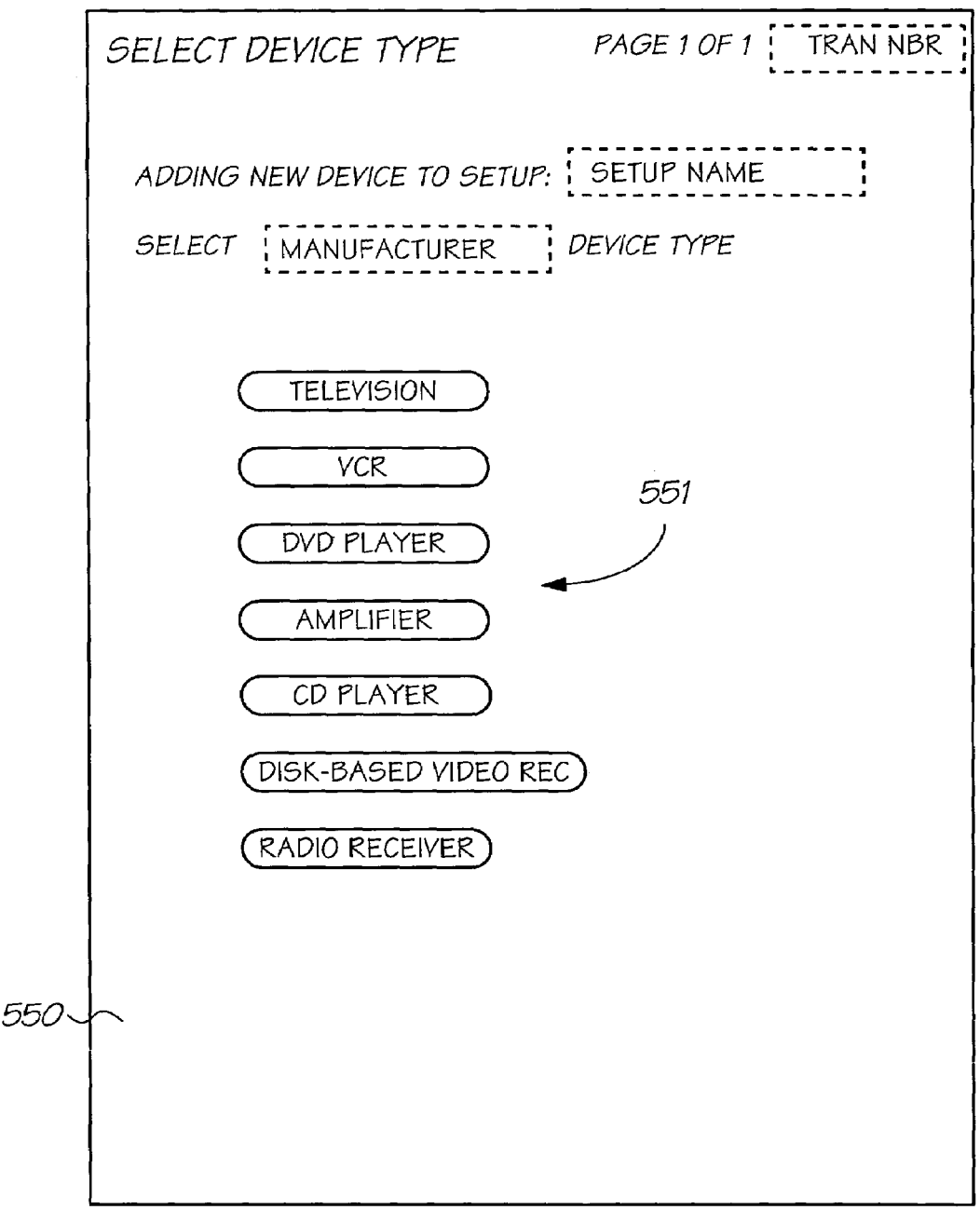
FIG. 27 is a schematic view of a select device type list.
Figure 28:
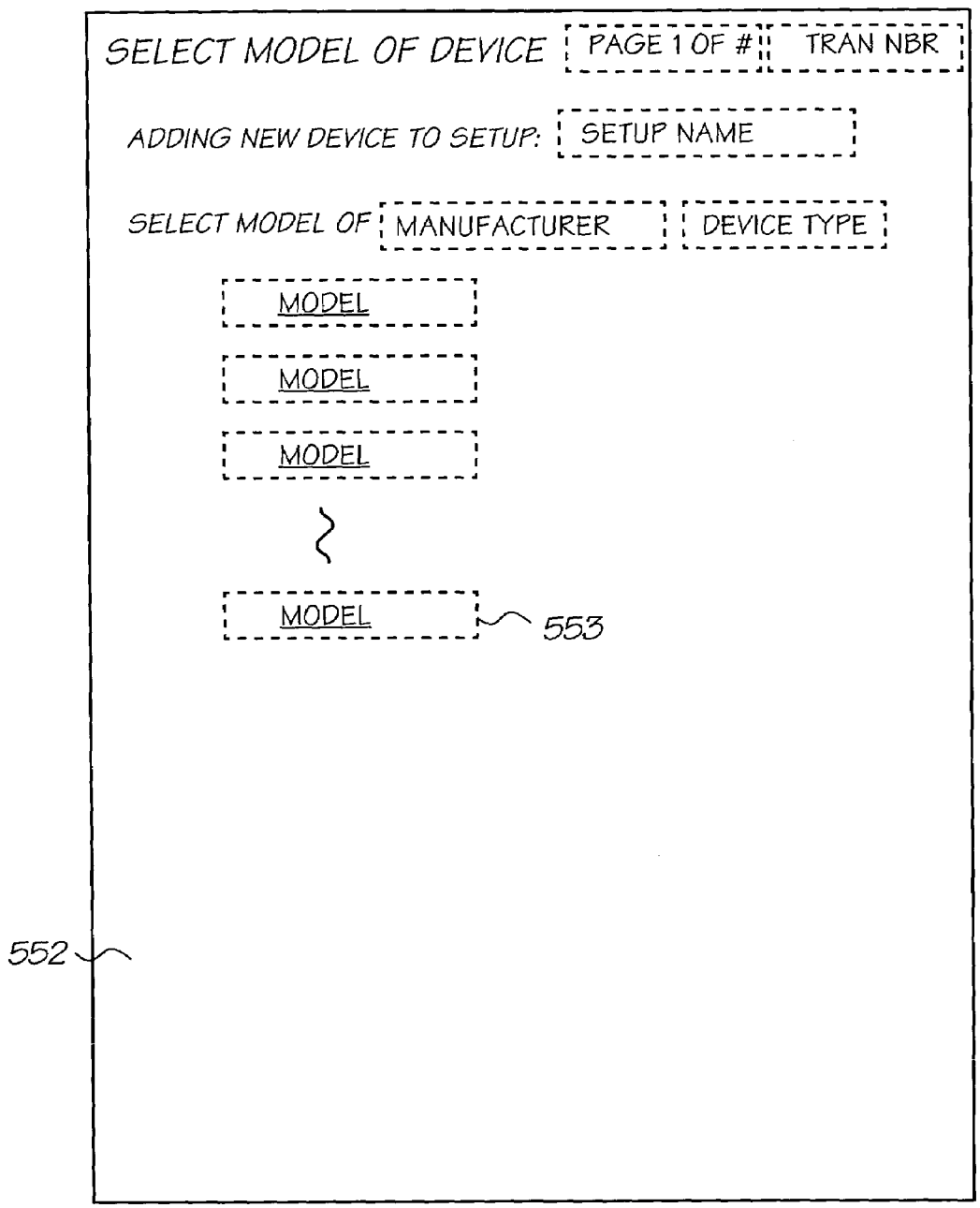
FIG. 28 is a schematic view of a select model list.

A new device 513 can be added to a device setup 511 by pressing the <Add New Device> button 547 on the Device Setup Details page 538. A Select Manufacturer page 548 is printed, as shown in FIG. 27. The user selects the device manufacturer 549 from the list by clicking the name of manufacturer. A Select Device Type page 550 is printed, as shown in FIG. 28.

The user selects the appropriate device type 551 from the list by clicking on the device type name. A Select Model page 552 is printed, as shown in FIG. 29.

Figure 30:
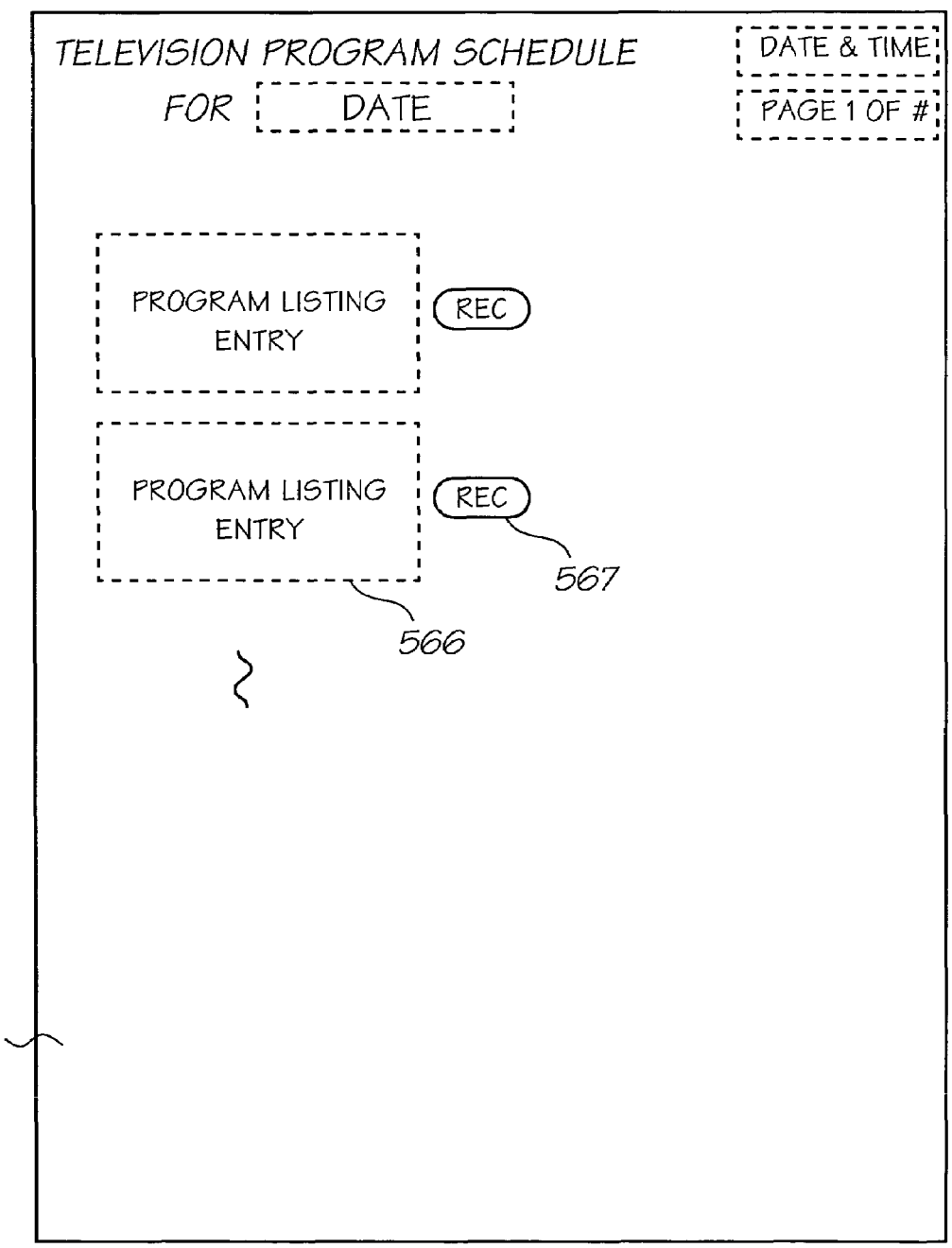
FIG. 30 is a schematic view of a program schedule.

The user selects the appropriate device model 553 from the list by clicking on the model name. The Set Device Defaults form 554 is printed, as shown in FIG. 30.

Figure 19:
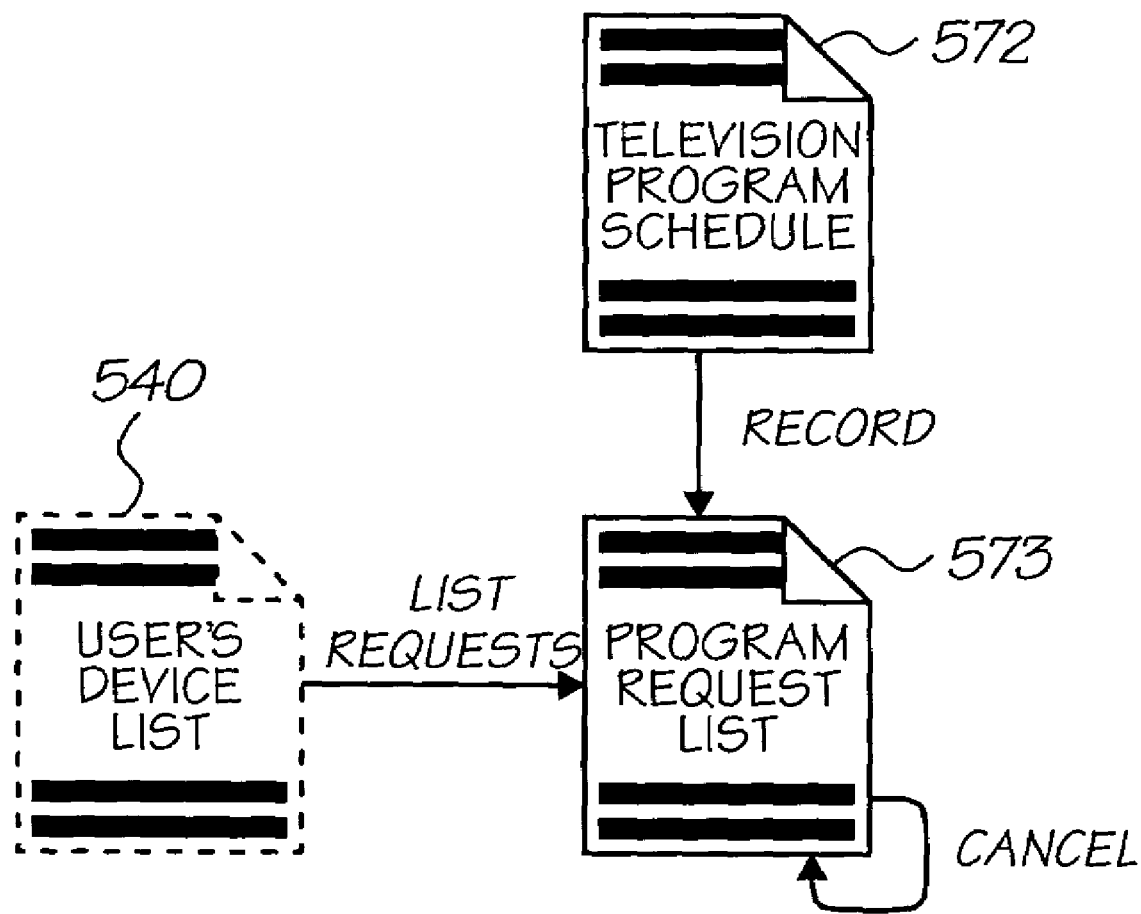
FIG. 19 is a schematic view of a record program user interface flow.

On the Set Device Defaults form 554 the user specifies an alias name for the device. The user then assigns this device as the default for one or more device types by checking the appropriate check boxes. For example, the user's VCR may be assigned as the default television tuner and default video recorder in their device setup. When the form is complete the user presses <Add Device> 555. The Device Setup Details page 538 is printed, showing the new device in the device list. The Add Device user interface flow is shown in FIG. 19.

User's Device List

The user typically obtains the User's Device List 540 from the Device Setup main page 534 (<List My Devices> button 539). The user may also bookmark the page and subsequently obtain it via their favorites list, or obtain it via their history list.

Figure 18:
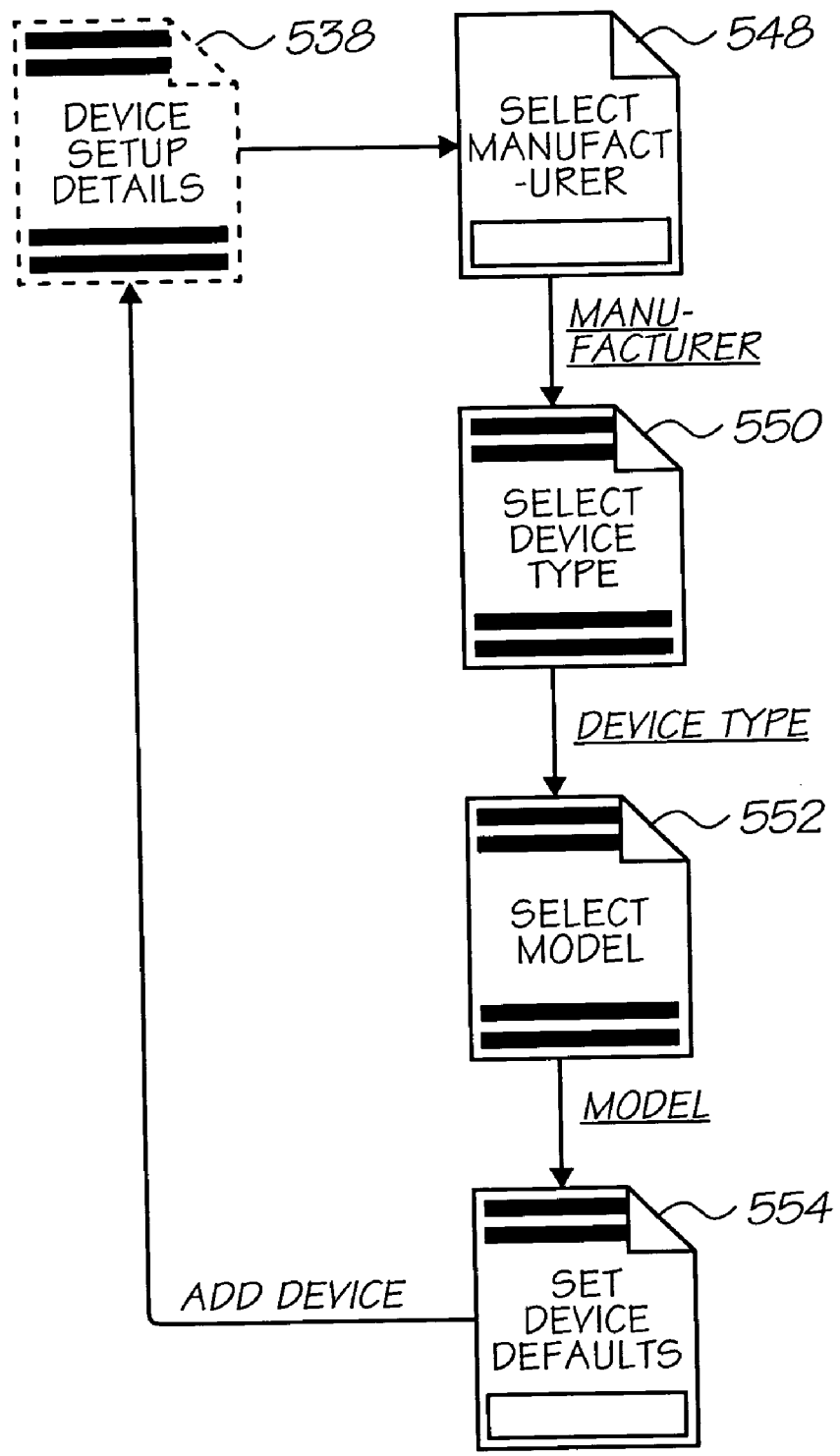
FIG. 18 is a schematic view of an add device user interface flow.

The Device List user interface flow is shown in FIG. 18.

Figure 25:
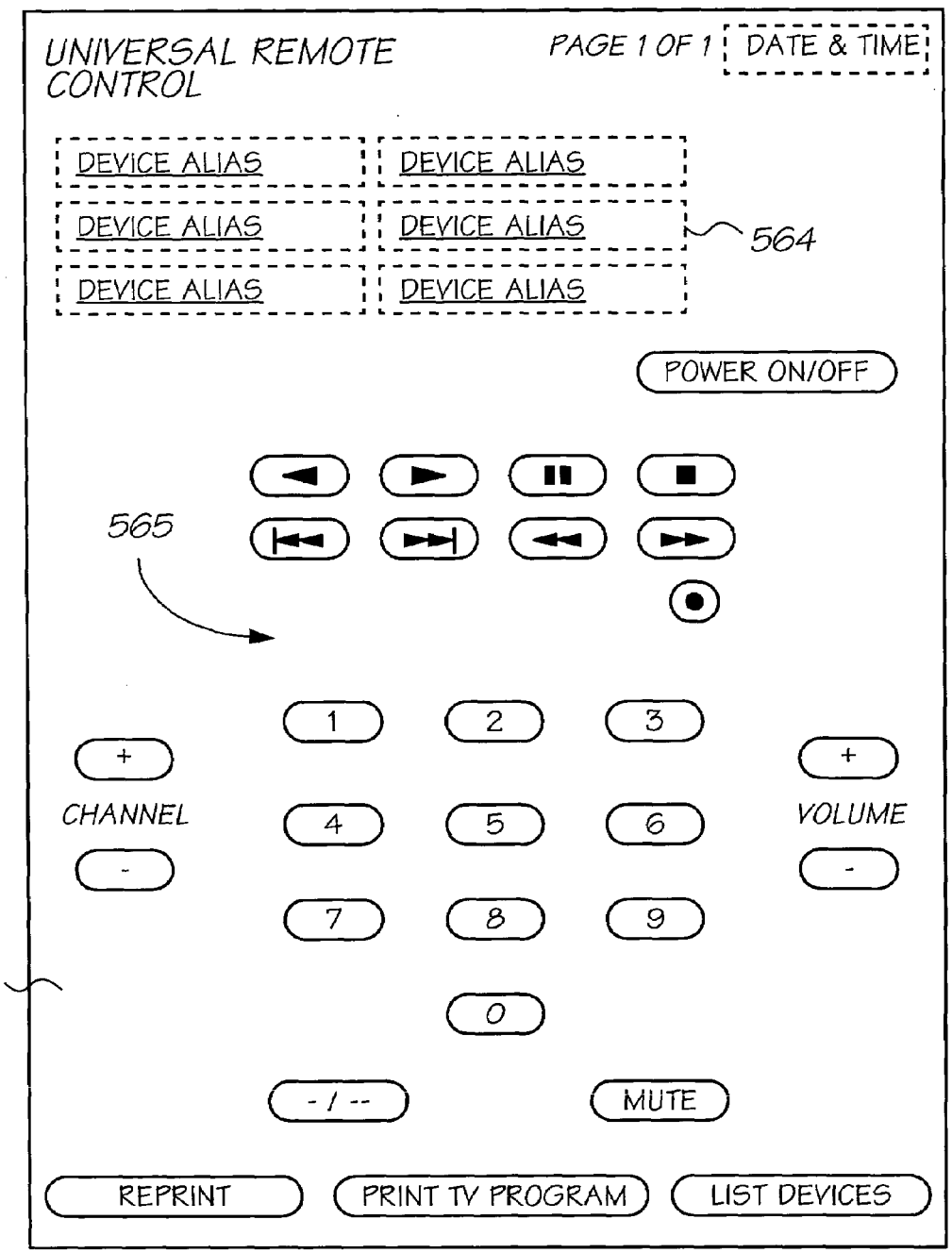
FIG. 25 is a schematic view of a universal remote control.

The Device List 540 is shown in FIG. 23 and indicates which devices are assigned as defaults for the setup. To print a Remote Control page 570 for a specific device the user clicks on the device name. An example of a device-specific television remote control 570 is shown in FIG. 25. A device-specific remote control 570 will only operate the device named at the top of the remote control. A device-specific remote control for a particular television will only operate that one television, and will not operate any other television.

Figure 24:
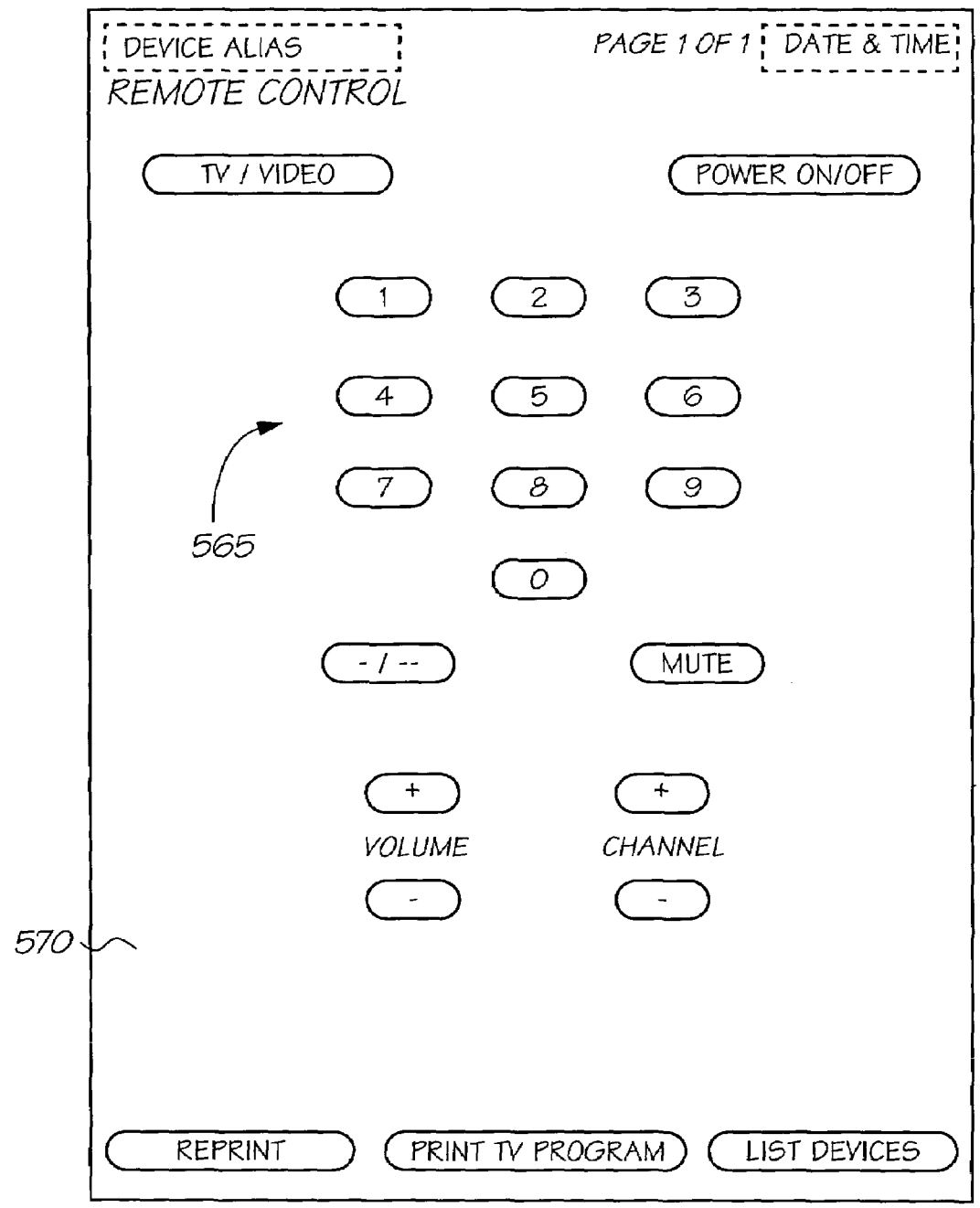
FIG. 24 is a schematic view of a device specific TV remote control.
Figure 26:
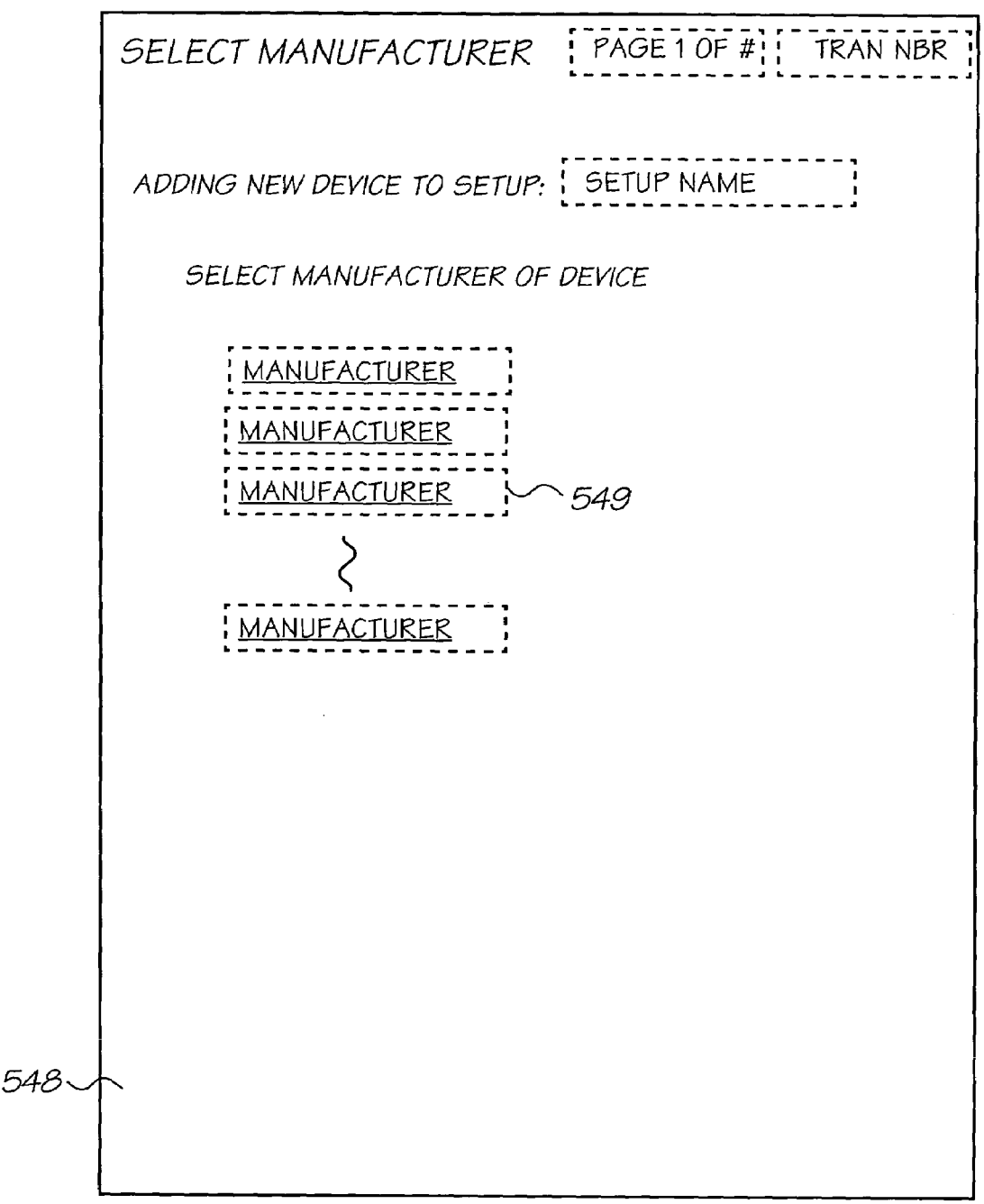
FIG. 26 is a schematic view of a select manufacturer list.

The user can press the <Create URC> button 556 to print a Create Universal Remote Control form 557, as shown in FIG. 24. This form lists all the devices in the current device setup. The user selects the devices to include on the URC by checking the appropriate device check boxes, and then clicking the <Print URC> button 558. The Universal Remote Control page 571 is printed. An example of a URC page 571 is shown in FIG. 26.

The user can press the <Device Setup> button 559 on the Device List Page 540 to print their Device Setup Details page 538.

The user can press the <Modify Defaults> button 560 to print a Modify Defaults form 561. This form allows the user to change the assignment of default devices.

The user can press the <List Requests> button 562 to print a Request List page 563. This lists all the video broadcasts scheduled to be recorded for the user's device setup.

Remote Controls

There are three types of remote control. These are the device-specific remote control, the universal remote control, and the generic remote control. Device specific and universal remote controls are printed by the user. Generic remote controls are printed in netpage publications such as television program schedules.

The appearance and functions of a remote control will depend on the device type, manufacturer etc. A manufacturer may provide their own netpage remote control which can be printed by the user on demand.

When the user presses a remote control button on a generic remote control the device control application looks up the appropriate default device in the user's device setup. This determines the user device and therefore the device model.

A universal remote control 571 is illustrated in FIG. 26. The device being controlled by a universal remote control is determined by its mode (set when a device alias name button 564 is pressed on the control). A device-specific remote control 570 as shown in FIG. 25 is associated with a single user device. Thus when the user presses a remote control button 565 on a device-specific or universal remote control the device alias name, and therefore the device model, of the device being controlled is known.

A remote control button 565 is associated with a remote control function 510, with a unique function identifier 517 (unique within the device model). The device model is referenced in the manufacturer's database to look up the RCI (Remote Control Interface) function 516 control code 565 for the required function identifier. This command code is then transmitted to the user device.

The method of the transmission may vary depending on the device's capability and the user's pen.

Scheduled Broadcast Recording

A netpage published television program schedule 572 contains a calendar of television broadcasts giving a description 566 of each program, and channel, date, and time information about the program. Each program listing may have associated with it one or more buttons 567, as shown in FIG. 31.

Figure 20:
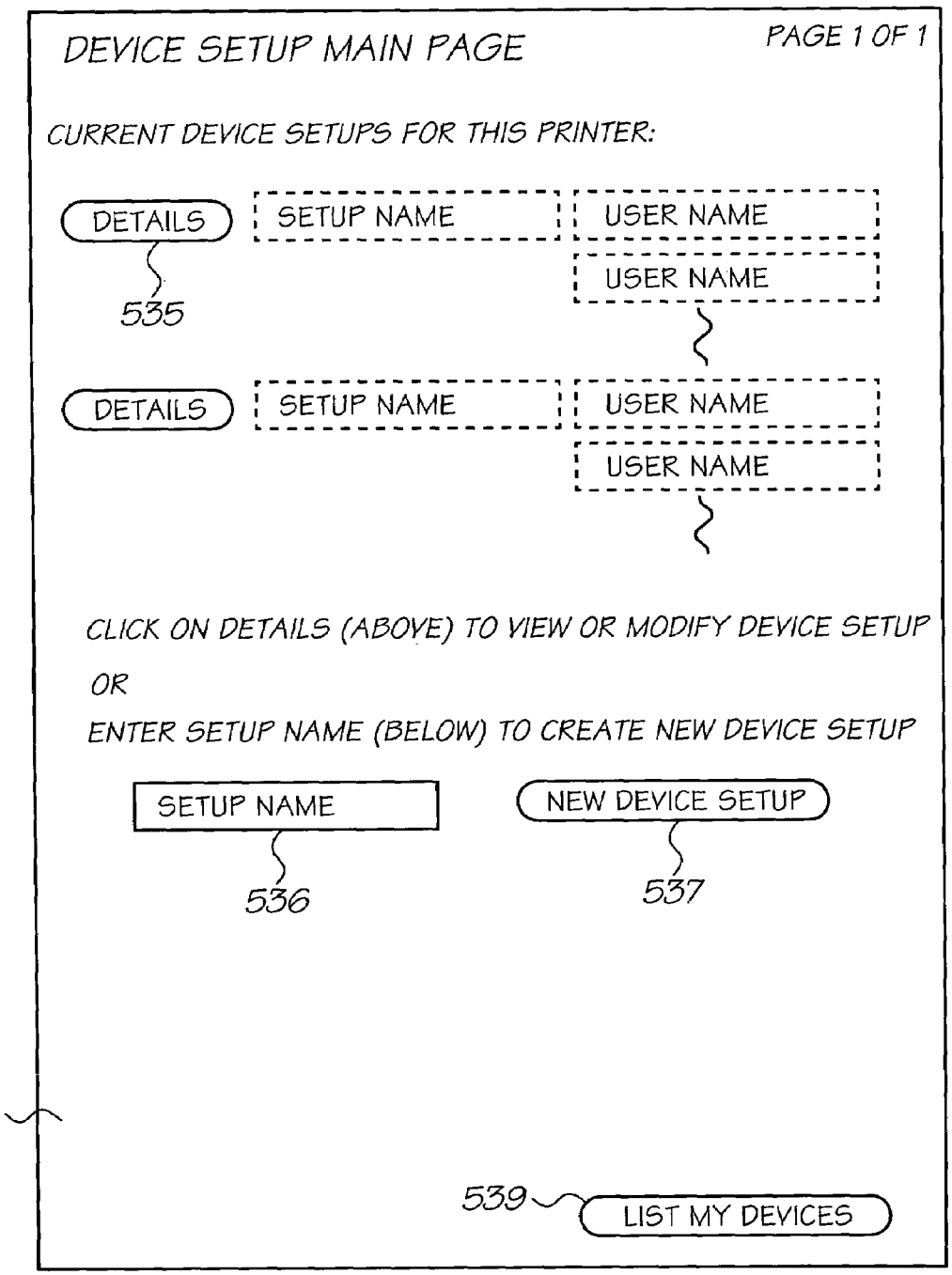
FIG. 20 is a detailed view of a device setup main page.

The <Record> button 567 can be used to program the user's default video recording device to record the requested broadcast. The request 568 is stored in the user's program request list 573 (associated with their device setup). The Record Program user interface flow is shown in FIG. 20.

As a more advanced service, a program information provider can send updated program information to the user's printer, or can add program requests to the user's program request list 573 on a regular basis for a user's favorite programs. It can also automatically modify existing requests if program information changes.

News Clips

A published news story can have an associated video clip and printed playback control buttons.

A set of news clips can be broadcast some time before the newspaper is delivered to the netpage printer 802. The printer 802 can be instructed by the publisher to listen to the broadcast and record the broadcast on the user's disk-based video recording system. Clip indexing information is transmitted with the video clips, for example in the closed caption part of the broadcast.

The buttons printed with the news story control playback of the broadcast video clip from the user's default disk-based video recorder to the user's default video monitor. Control buttons may include play, stop, slow motion, and freeze frame.

Another type of video clip is the video-on-demand (VOD) video clip. A VOD video clip is broadcast to the user on demand, from a third party VOD supplier.

Parental Control

The Netpage device control system can also be used to give parental control over rated content. The system administrator can set the allowable content rating for particular users. A user without the required authority cannot operate a remote control to view rated channels or broadcasts.

CONCLUSION

The present invention has been described with reference to a preferred embodiment and number of specific alternative embodiments. However, it will be appreciated by those skilled in the relevant fields that a number of other embodiments, differing from those specifically described, will also fall within the spirit and scope of the present invention. Accordingly, it will be understood that the invention is not intended to be limited to the specific embodiments described in the present specification, including documents incorporated by cross-reference as appropriate. The scope of the invention is only limited by the attached claims.

The invention claimed is:

1. A method of enabling a device to be controlled via a printed control interface, the control interface comprising user control instructions relating to the device and the control interface including invisible coded data and visible graphic data printed substantially simultaneously thereon by a single printer wherein the invisible coded data is indicative of an identity of the control interface and of coordinates of a plurality of reference points of the control interface, the coded data identifying a unique location of each of the reference points relative to the control interface, and wherein when the single printer prints the invisible coded data and the visible graphic data on the control interface substanitally simulataneously, a computer system automatically associates a type and spatial extent of each reference point of the invisible coded data with a spatial extent of at least some of the visible graphic data in which the device is operative to perform at least one function in response to control instructions from the computer system, the method including the steps of:

receiving, in the computer system, indicating data from an optical sensing device regarding the identity of the control interface and a position of the sensing device relative to the control interface, the sensing device, when placed in an operative position relative to the control interface, reading at least some of the coded data on the control interface, and generating the indicating data using at least some of the read coded data; and effecting, in the computer system and from the indicating data, an operation relating to at least one parameter of the control instructions.

2. The method of claim 1 in which said at least one parameter relating to the control instructions is associated with at least one zone of the control interface and in which the method includes effecting, in the computer system and from the zone relative to which the sensing device is located, an operation relating to said at least one parameter.

3. The method of claim 2 which includes receiving, in the computer system, data regarding movement of the sensing device relative to the control interface, the sensing device sensing its movement relative to the control interface using at least some of the coded data; and effecting, in the computer system and from said movement being at least partially within said at least one zone, an operation relating to said at least one parameter of the control instructions.

4. The method of claim 1 in which the parameter of the control instructions is selected from the group comprising:
selecting said device;
selecting said function to be performed;
establishing default setting for said function;
establishing default setting for said device;
registering user access to control the device function;
authorizing user access to control the device function; and
issuing a command code to said device to perform said function.

5. The method according to claim 1 further including the step of issuing a command code to said device to perform said function in response to operation of the computer system.

6. The method of claim 5 in which the command code is issued to said device through said sensing device.

7. The method of claim 5 in which the command code is issued to said device independently of said sensing device.

8. The method according to claim 5 in which the command code is issued to said device using wireless technology.

9. The method of claim 1 which includes printing the control interface on demand.

10. The method of claim 9 which includes printing the control interface on a surface of a surface-defining means and, at the same time that the control interface is printed, printing the coded data on the surface.

11. The method of claim 1 which includes retaining a retrievable record of each control interface generated, the control interface being retrievable using its identity as contained in its coded data.

12. The method of claim 1 which includes distributing a plurality of the control interfaces using a mixture of multicast and pointcast communications protocols.

13. The method of claim 1 in which the sensing device contains an identification means which imparts a unique identity to the sensing device and identifies it as belonging to a particular user and in which the method includes monitoring, in the computer system, said identity.

14. The method of claim 1 which includes providing all required information relating to the device function in the control interface to eliminate the need for a separate display device.

15. The method of any one of claim 1 in which the control interface is printed on multiple pages and in which the method includes binding the pages.

16. A system for enabling at least one function of a device to be controlled, the system including:

a printed control interface comprising user control instructions relating to the device and coded data indicative of an identity of the control interface and of coordinates of a plurality of locations on the control interface and including invisible coded data and visible graphic data printed substantially simultaneously thereon by a single printer, wherein the invisible coded data is indicative of an identity of the control interface and of a plurality of coordinates of reference points of the control interface, the coded data identifying a unique location of each of the reference points relative to the control interface, and wherein when the single printer prints the invisible coded data and the visible graphic data on the control interface substanitally simulataneously, a computer system automatically associates a type and spatial extent of each reference point of the invisible coded data with a spatial extent of at least some of the visible graphic data; and a computer system incorporating control instructions operative to cause said device to perform said function and operative to receive indicating data from an optical sensing device for effecting an operation relating to at least one parameter of the control instructions, the indicating data being indicative of the identity of the control interface and a position of the sensing device relative to the control interface, the sensing device reading the coded data on the control interface and generating the indicating data using at least some of the read coded data.

17. The system of claim 16 in which said at least one parameter relating to the control instructions is associated with at least one zone of the control interface.

18. The system of claim 16 which includes the sensing device sensing its movement relative to the control interface using at least some of the coded data.

19. The system of claim 16 in which the parameter of the control instructions is selected from the group comprising:
selecting said device;
selecting said function to be performed;
establishing default setting for said function;
establishing default setting for said device;
registering user access to control the device function;
authorizing user access to control the device function; and issuing a command code to said device to perform said function.

20. A system according to claim 16 in which the computer is operative to issue a command code to said device to perform said function through said sensing device.

21. A system according to claim 16 in which the computer is operative to issue a command code to said device to perform said function independently of said sensing device.

22. The system of claim 16 in which the sensing device contains an identification means which imparts a unique identity to the sensing device and identifies it as belonging to a particular user.

23. The system of claim 16 in which the control interface is printed on a surface of a surface-defining means and in which the system includes a printer for printing the control interface on demand.

24. The system of claim 23 in which the printer prints the coded data at the same time as printing the control interface on the surface-defining means.

25. The system of claim 16 which includes a database for keeping a retrievable record of each control interface generated, each control interface being retrievable by using its identity as included in its coded data.

26. The system of claim 23 in which, to cater for a control interface printed on multiple pages, the printer includes a binding means for binding the pages.

* * * * *